Oct. 7, 1941.　　　F. M. CARROLL　　　2,258,109
CONVEYING MECHANISM
Original Filed Jan. 26, 1937　　12 Sheets-Sheet 1

INVENTOR.
FRED M. CARROLL
BY
ATTORNEYS.

Oct. 7, 1941.   F. M. CARROLL   2,258,109
CONVEYING MECHANISM
Original Filed Jan. 26, 1937   12 Sheets-Sheet 3

INVENTOR.
FRED M. CARROLL,
BY
ATTORNEYS.

Oct. 7, 1941.  F. M. CARROLL  2,258,109
CONVEYING MECHANISM
Original Filed Jan. 26, 1937   12 Sheets-Sheet 4
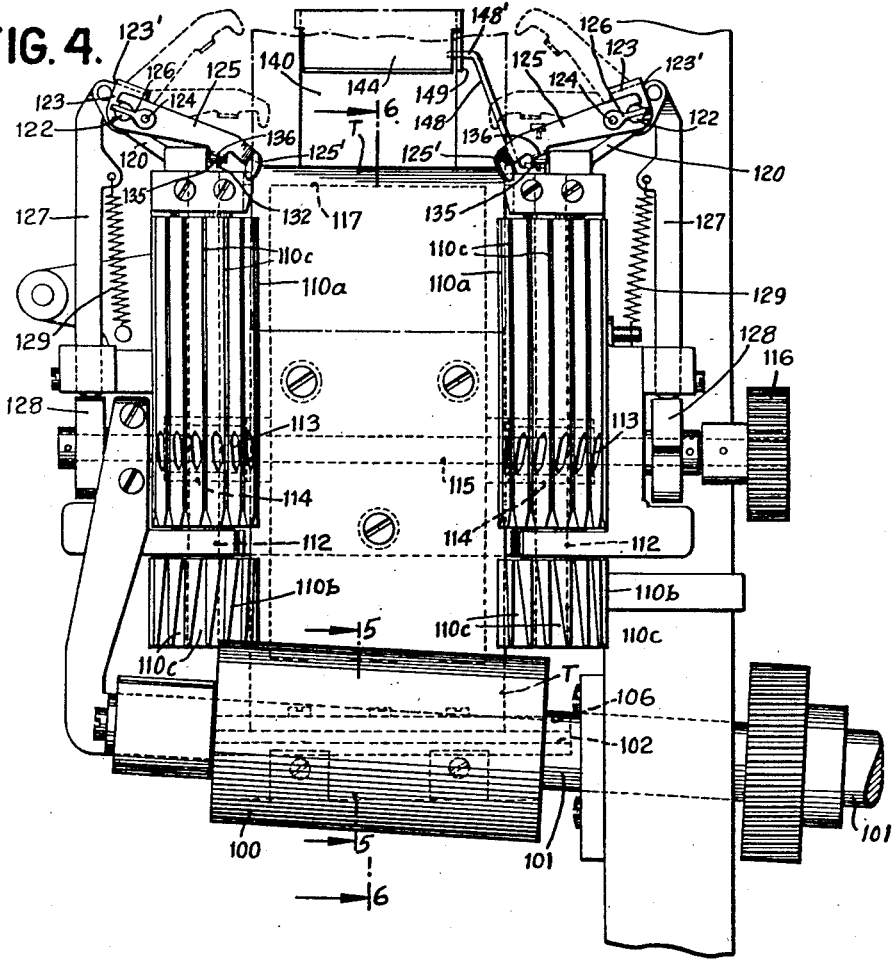
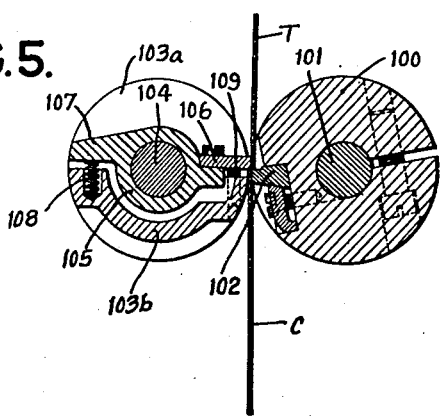
INVENTOR.
FRED M. CARROLL
BY
ATTORNEYS.

Oct. 7, 1941.　　　F. M. CARROLL　　　2,258,109
CONVEYING MECHANISM
Original Filed Jan. 26, 1937　　12 Sheets-Sheet 5
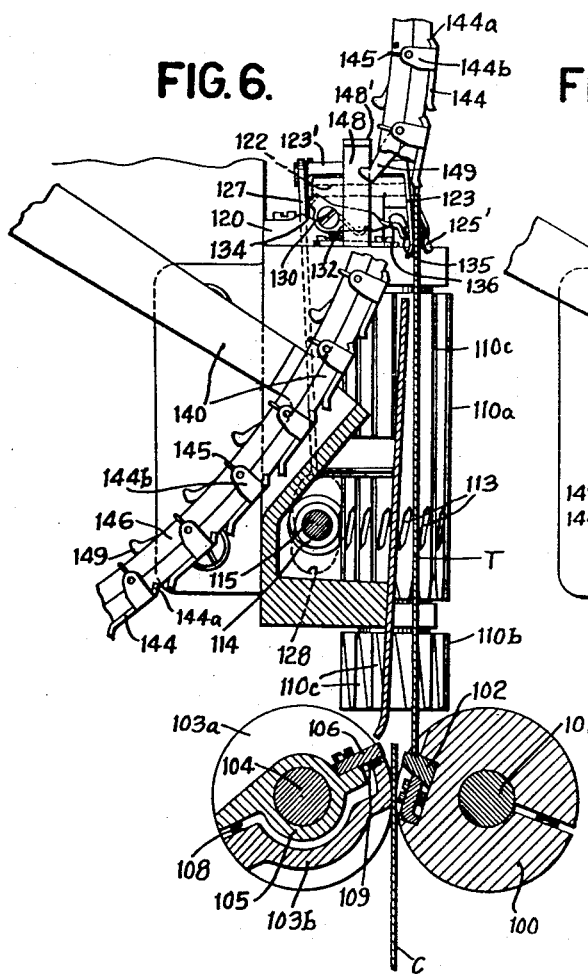
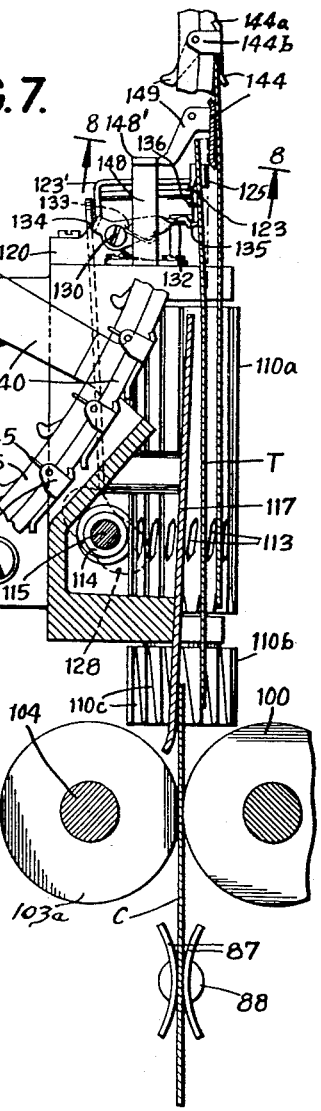
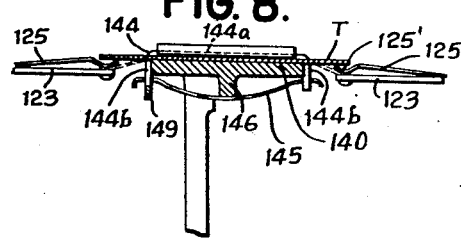
INVENTOR.
FRED M. CARROLL
BY
ATTORNEYS.

Oct. 7, 1941.                F. M. CARROLL                2,258,109
                          CONVEYING MECHANISM
                Original Filed Jan. 26, 1937    12 Sheets-Sheet 6

INVENTOR.
FRED M. CARROLL
BY
                ATTORNEYS.

Oct. 7, 1941.  F. M. CARROLL  2,258,109
CONVEYING MECHANISM
Original Filed Jan. 26, 1937  12 Sheets—Sheet 7

INVENTOR.
FRED M. CARROLL
BY
ATTORNEYS.

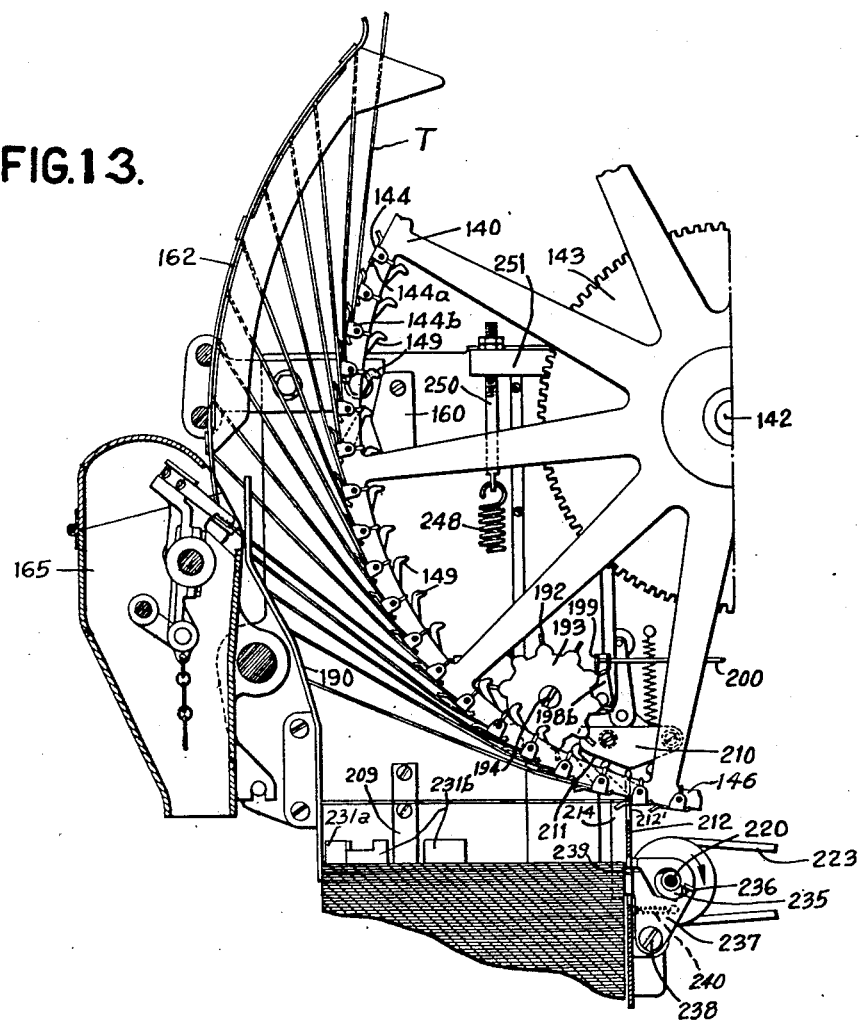

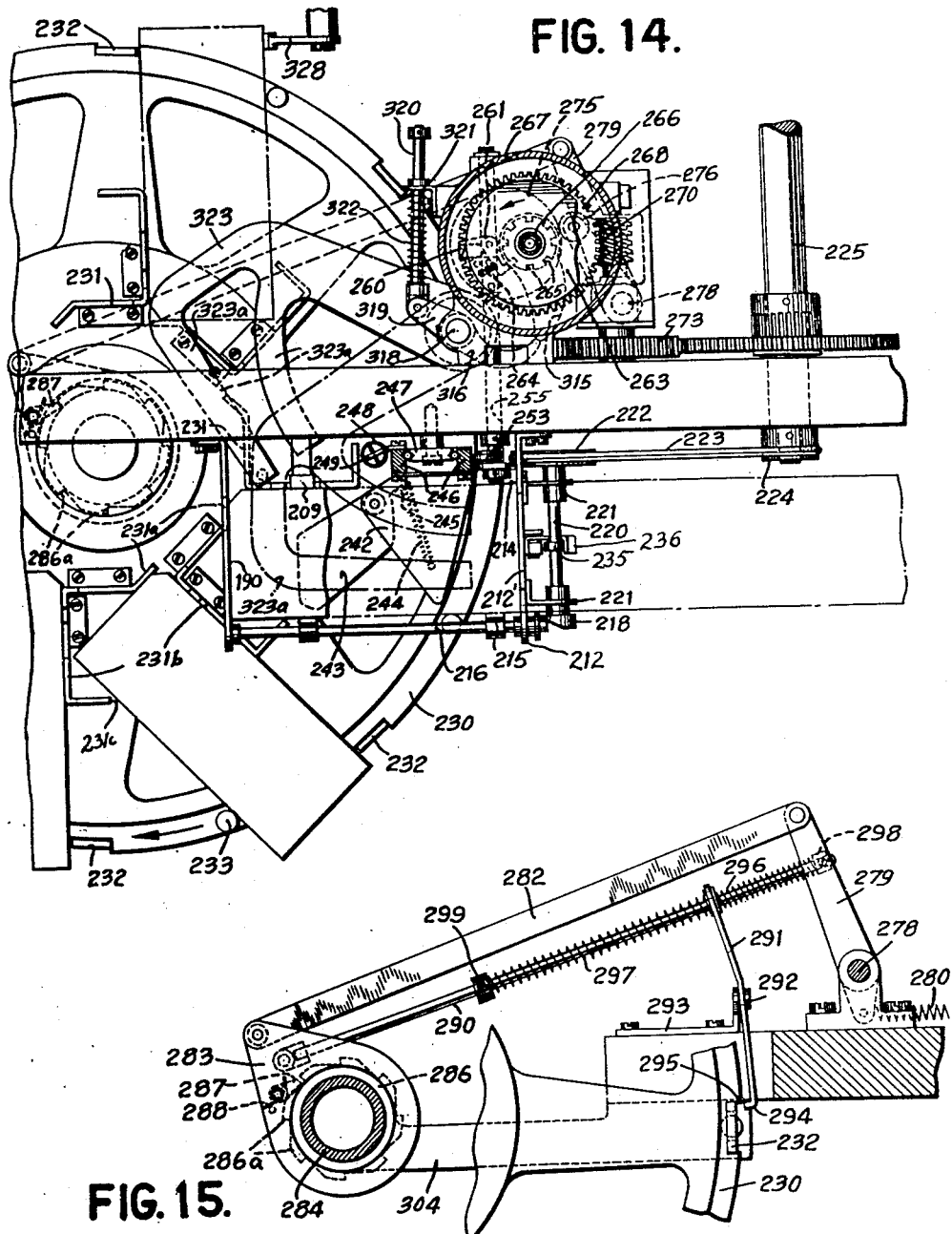

Oct. 7, 1941.     F. M. CARROLL     2,258,109
CONVEYING MECHANISM
Original Filed Jan. 26, 1937     12 Sheets-Sheet 10
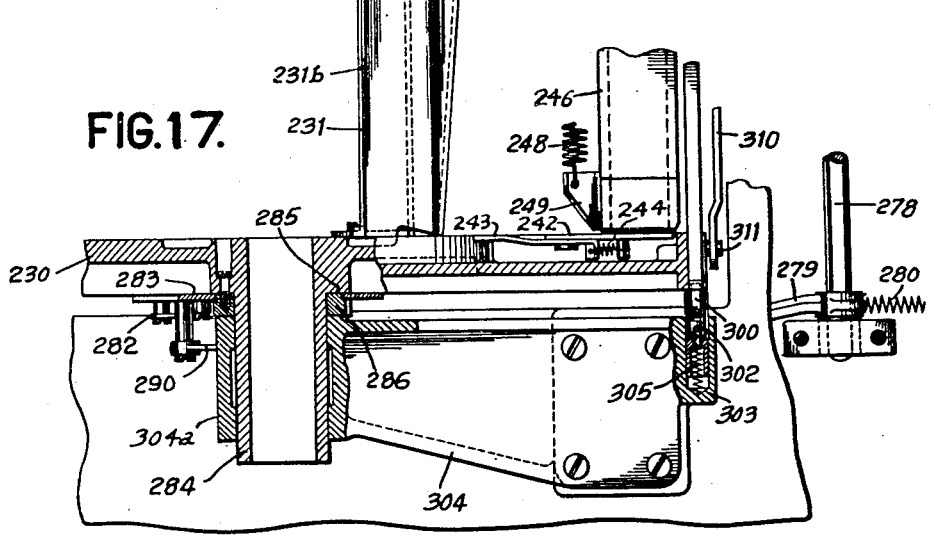
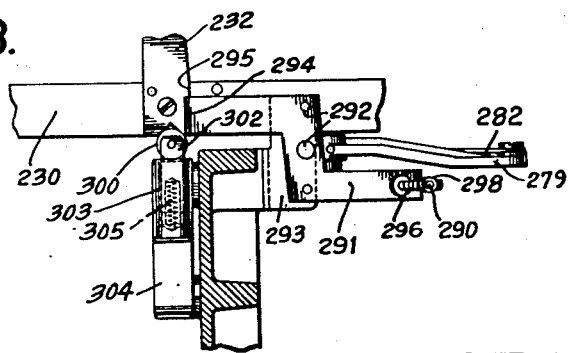
INVENTOR.
FRED M. CARROLL
BY
ATTORNEYS.

Oct. 7, 1941. F. M. CARROLL 2,258,109
CONVEYING MECHANISM
Original Filed Jan. 26, 1937   12 Sheets-Sheet 11
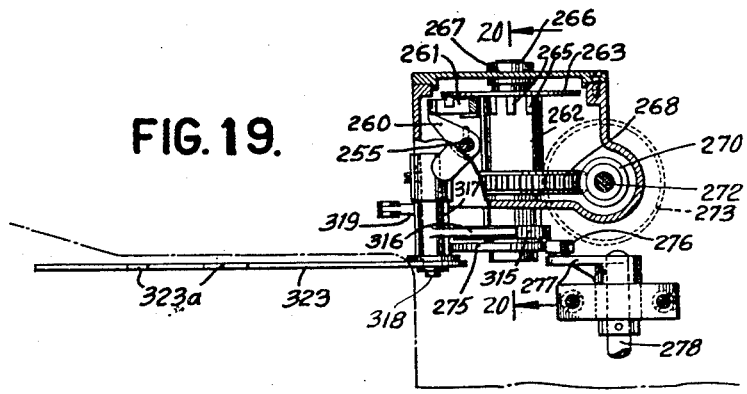
FIG. 19.
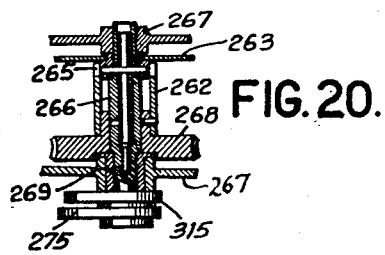
FIG. 20.
FIG. 21.
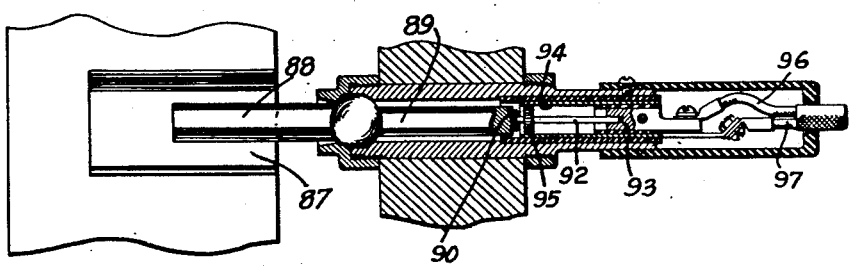
FIG. 23.
FIG. 22.
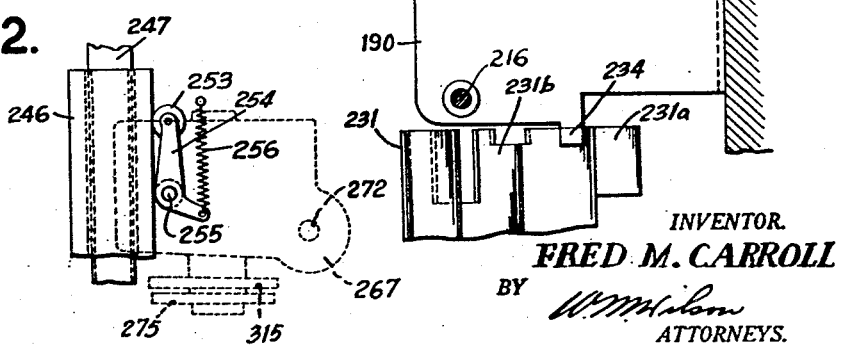
INVENTOR.
FRED M. CARROLL
BY
ATTORNEYS.

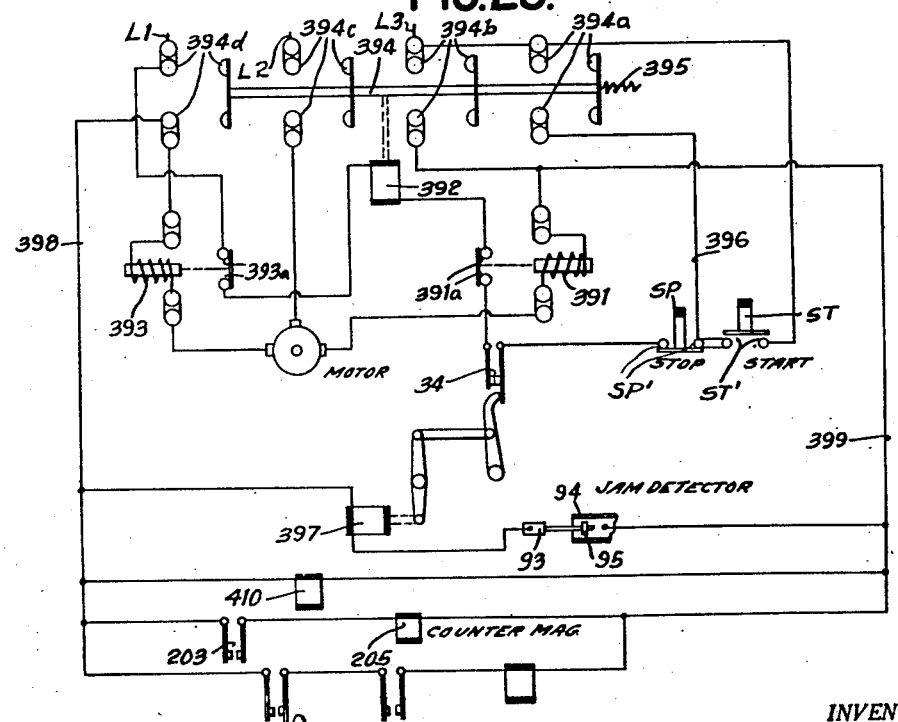

Patented Oct. 7, 1941

2,258,109

UNITED STATES PATENT OFFICE 2,258,109

CONVEYING MECHANISM

Fred M. Carroll, Binghamton, N. Y., assignor to International Business Machines Corporation, New York, N. Y., a corporation of New York Original application January 26, 1937, Serial No. 122,360. Divided and this application May 3, 1938, Serial No. 205,721

34 Claims. (Cl. 271—51)

This case relates to a machine for operating on a web to produce printed record cards therefrom, and is a division of my application serial No. 122,360, filed January 26, 1937.

The machine operates on a blank continuous strip of material; i. e., on the web, to print record forms thereon which are cut apart to form individual cards, each with a printed card form. The particular record card produced is known as a tabulating card which in subsequent use is punched to control automatic bookkeeping or accounting machines.

It is contemplated broadly, to provide novel means for handling material, particularly material in continuous movement, and, further, to handle individual articles or lengths produced from such material. It is also contemplated to provide novel stacking means, a novel conveyor, particularly one for individually carrying articles and a novel means for transferring an article from an operating means to the conveyor.

More specifically, an object is to provide novel means for handling a web and cards produced from the web.

Further, an object is to provide novel means for withdrawing the cards from card-forming means.

A further object is to provide novel means for transferring the cards from the card forming means to a conveyor.

Another object is to provide novel means for receiving the cards from the conveyor.

Still another object is to provide novel card stacking means.

It is also an object to provide a novel card conveyor.

It is still another object to provide a conveyor for holding cards or forms, just printed on, out of contact with each other to enable the ink to dry while the forms are being conveyed.

Objects also are to provide novel means for interrupting feeding of the web and cards upon detecting jamming of the web, for interrupting operation of the feeding means when the supply roll is depleted, or when inserting a new supply roll, or when the web exceeds a permissible thickness.

Further objects of the instant invention reside in any novel feature of construction or operation or novel combination of parts present in the embodiment of the invention described and shown in the accompanying drawings, whether within or without the scope of the appended claims and irrespective of other specific statements as to the scope of the invention contained herein.

In the drawings:

Fig. 4 is a detail front view of the cutters, web and card guides, and intermediate card delivering grippers;

Fig. 5 is a section on lines 5—5 of Fig. 4, showing the web cutters coacting to cut a card;

Fig. 6 is a section on lines 6—6 of Fig. 4, including the cutters at a later stage of operation after the card has been cut apart from the web;

Fig. 7 is similar to Fig. 6 showing the card fully inserted in position to be gripped by a clip on the conveying drum.

Fig. 8 is a section on lines 8—8 of Fig. 7.

Fig. 13 is a sectional view of part of Fig. 11;

Fig. 14 is a plan view of the card stacker table and associated parts;

Fig. 15 is a detail sectional view of the stacker table actuating and stopping mechanism;

Fig. 16 is a sectional, plan, view of the card counting control;

Fig. 17 is a detail vertical section of part of the stacker table and associated parts;

Fig. 18 is a detail view of part of the stacker table positioning means;

Fig. 19 is a detail, front view of the drive for the stacker table actuating means and for the card catcher, partly sectioned;

Fig. 20 is a section on lines 20—20 of Fig. 19;

Fig. 21 is a detail section through the web buckling detecting device;

Fig. 22 is a detail view of the control for the stacker stepping means;

Fig. 23 is a detail view of the lower end of a guide plate for guiding an edge of the cards into a stacker pocket;

Fig. 24 shows a card produced by the machine; and

Fig. 25 is the circuit diagram.

Figure 1:
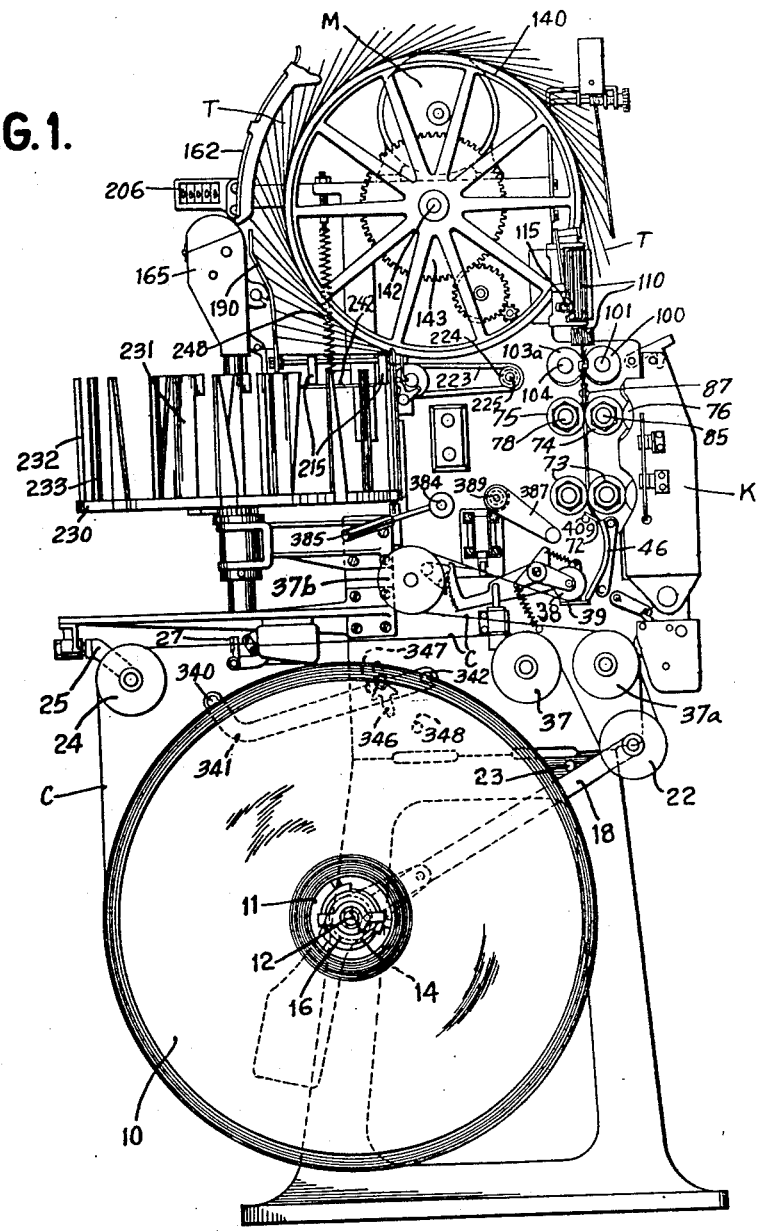
Fig. 1 is a side view of the machine.
Figure 2:
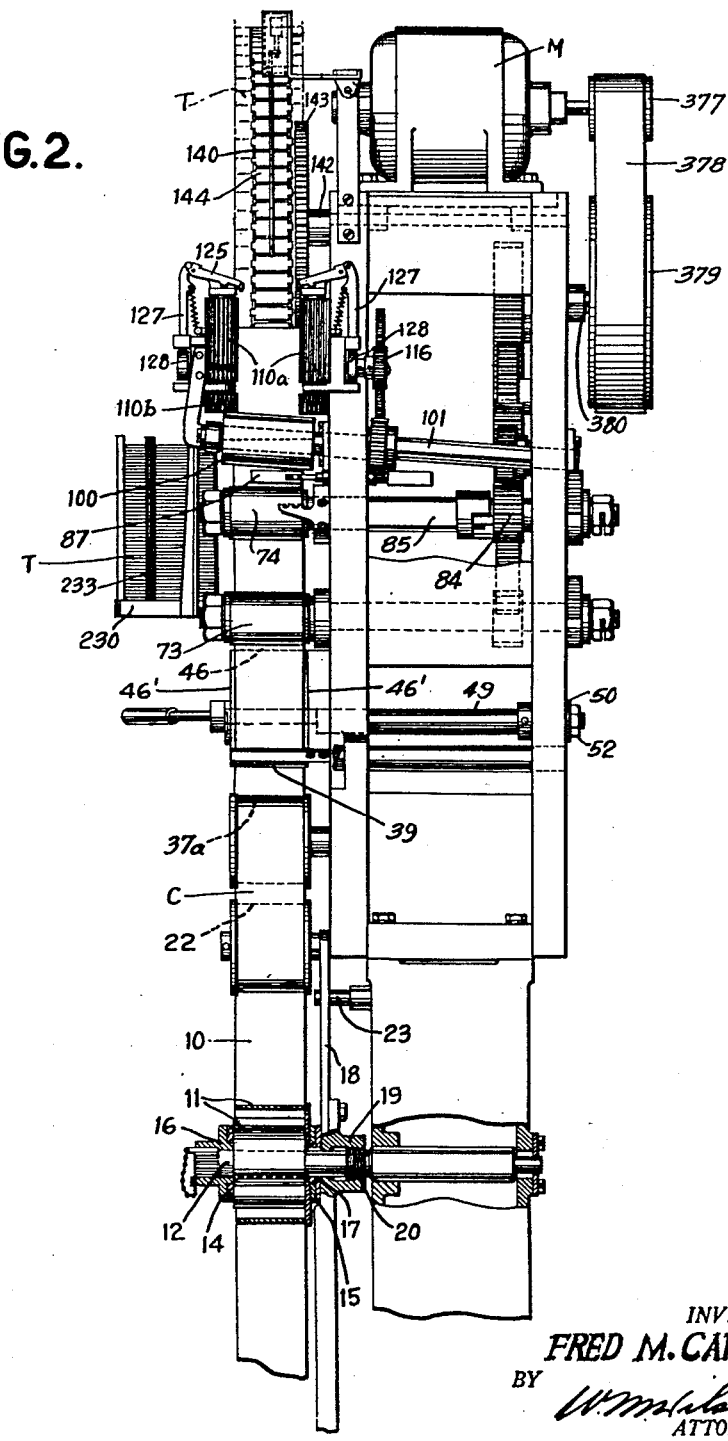
Fig. 2 is a front view, partly sectioned and with parts removed or broken away to show normally concealed parts.

Referring to Figs. 1 and 2, the supply roll 10 of blank card material C is carried by a two-part spool 11 located on a shaft 12 fixed to a leg of the frame. The spool 11 is located between friction washers 14 and 15, the former encircling the neck of a collar 16 removably secured to the outer end of the shaft 12 adjacent the spool, and the washer 15 encircling the neck of a collar 17 keyed to shaft 12. Surrounding shaft 12 and engaging the side of collar 17 opposite friction washer 15 is the hub of a lever 18, the hub having an internally threaded nut portion 19 coacting with the threaded portion 20 of shaft 12. The outer end of lever 18 carries a guide roller 22 for the web of material C coming off the supply roll 10. The distribution of weight of the arms of lever 18, added to the weight of roller 22, is such as to impart a tendency to the lever to swing clockwise (Fig. 1). Accordingly, roller 22 would drop unless supported by the web looped around the bottom of the roller. The roller thus exerts force on the web C to maintain it under tension. As long as the web is feeding properly off the roll 10, it will act on roller 22 to support the roller 22 and lever 18 in upper position, limited by engagement of the lever with a fixed stud 23. In the upper position of lever 18, the spool 11 is free to rotate between friction washers 14 and 15. When the web stops feeding from the supply roll or is cut off above the roller 22 in a manner to release the tension of the web on roller 22, then lever 18 drops and by the coaction of its nut portion 19 with threaded portion 20 of shaft 12, the hub of the lever is moved towards spool 11, thereby compressing the spool between washers 14 and 15, which thereby act to brake the spool and stop rotation of the supply roll 10 due to momentum.

The web of material C is led from roll 10 over a guide roller 24 journaled by an arm 25 which is swiveled to a part of the frame to tilt laterally or sidewise. The axis of lateral movement of guide roller 24 is substantially in line with the top of the roller, and consequently with the direction of feed of the web as it leaves the guide roller. Thus, the top of the roller will have substantially no lateral tilting movement, so that the web will be directed thereby in a predetermined, constant, path. The rest of the roller below the top is laterally tiltable to follow the side weave of the web as it comes off the supply roll, while the top of the roller is effective to direct the web in a straight, predetermined path. The action of roller 24 may be clear if it be considered that the roller is always tilted in the direction which the web takes as it leaves the supply roll 10.

Figure 3:
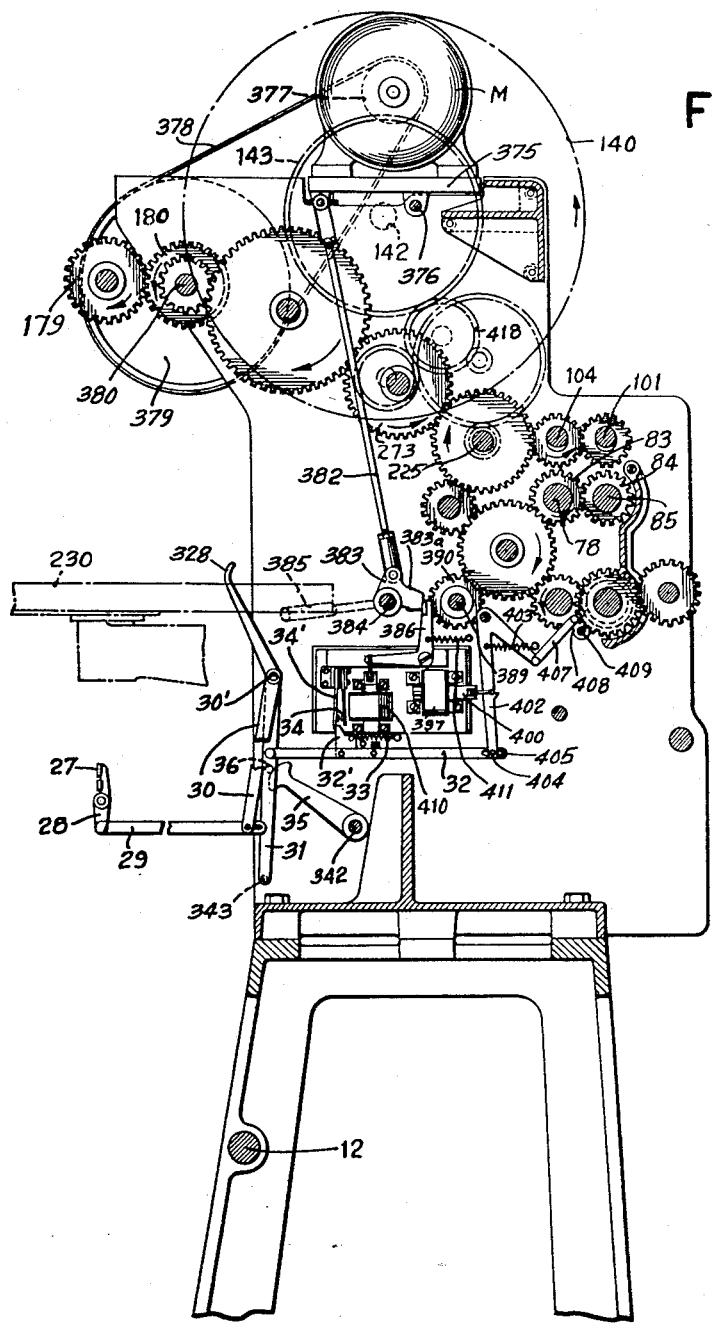
Fig. 3 is a sectional view, showing the drive gears.
Figure 10:
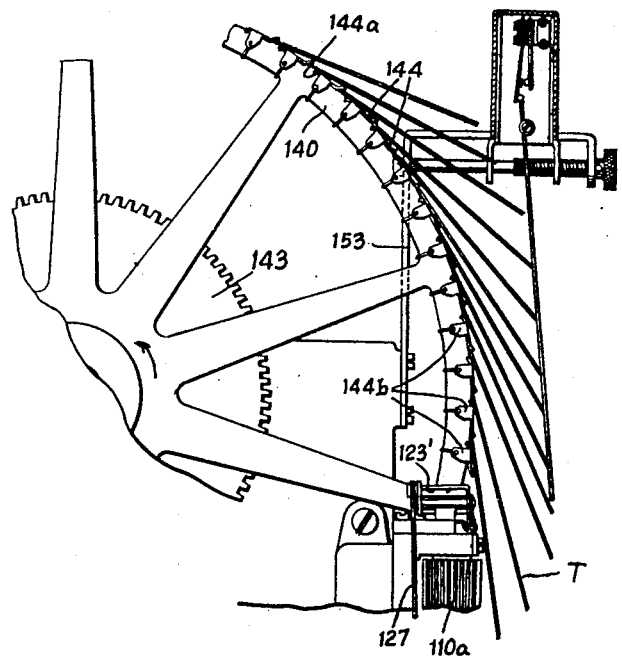
Fig. 10 is an enlarged view, partly in section, of the upper right corner of Fig. 1.
Figure 9:
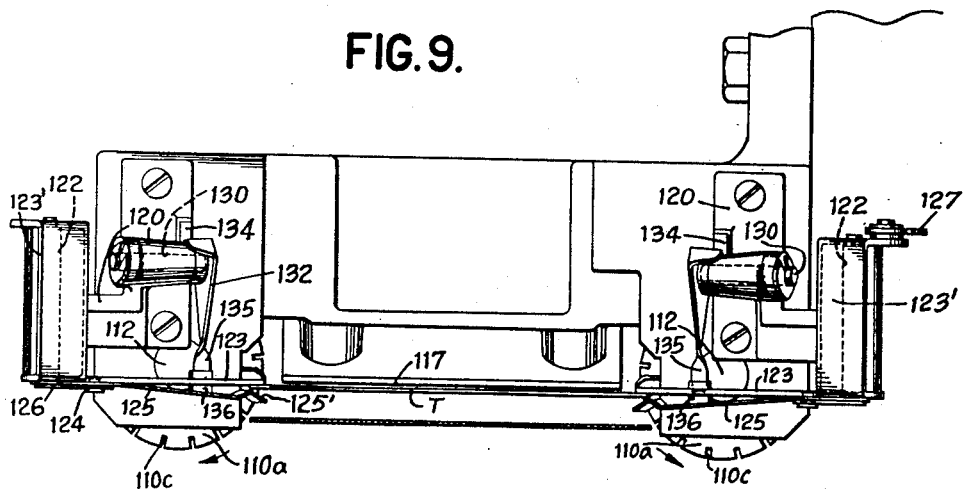
Fig. 9 is a plan view of the intermediate card gripper and delivery mechanism.

From roller 24, the web is threaded through the horizontally extending slot of a plate 27 formed on the upper arm of a lever 28 (see Figs. 1 and 3). The lower end of lever 28 is connected to a link 29 which has a pin and slot connection with a rocker arm 30 rigidly and dependently carried by its pivot 30'. Also fixed to pivot 30' is a depending arm 31, pivotally connected to a horizontally movable bar 32, which carries an insulating block 32' connected to a spring 33. Spring 33 normally urges bar 32 to the right (Fig. 3) to withdraw block 32' from a spring blade 34' carrying one of the coacting points of a switch 34. When bar 32 is permitted to move to the right under the influence of spring 33, then contacts 34 are enabled to close for conditioning the machine for operation. When bar 32 is moved to the left, into the position shown in Fig. 3, then block 32' acts on spring blade 34' to open the switch 34, interrupting machine operation.

Under several conditions, bar 32 is moved to the left to open switch 34. In Fig. 3, bar 32 has been moved to the left by means of the camming engagement between the rounded end of an arm 35 and a stud 36 carried by arm 31. Arm 35 is in this position when a supply roll 10 is being inserted, as will be explained later.

When the machine is in operation, bar 32 and arms 30 and 31 are further to the right than shown in Fig. 3, and the pin and slot connection between link 29 and arm 30 is operatively engaged, so that movement of the link to the left will rock arm 30 clockwise. When arm 30 is rocked clockwise, its pivot 30' and arm 31 also rock clockwise, causing bar 32 to move to the left, so that block 32 opens contacts 34 to stop machine operation. Link 29 is moved to the left to effect opening of switch 34 in above manner when lever 28 rocks clockwise. This happens if the web threaded through the slot in plate 27 of lever 28 is too thick to pass through the slot freely. If the web is of proper thickness, it passes through the slot freely and does not cause movement of lever 28. When the web is too thick, it rocks lever 28 clockwise to cause switch 34 to open and stop operation of the machine. Slotted plate 27 is thus a thickness gage for the web or a thickness detector to cause the machine to stop if the web exceeds the maximum permissible thickness.

From the thickness gage, the web proceeds over a guide roller 37, around previously mentioned web-tensioning roller 22, and around guide rollers 37a and 37b. From roller 37b, the web is passed between the bottom of a roll 38 and the top of a plate 39 (Figs. 1 and 2) tangentially disposed relative to roller 38. The web passes between roller 38 and plate 39, then proceeds upwardly along a convex guide plate 46, having side flanges 46' to engage the sides of the web and prevent lateral movement of the web. The web proceeds along curved, flanged, guide plate 46, past a knife blade 72 (Fig. 1), but without touching the latter, and into the grip of feed rollers 73. The curve of the web against guide plate 46 stiffens it sidewise or transversely so that pressure exerted by the sides of the web against the web-confining side flanges 46' of plate 46 will not tend to bend or crimp the web vertically. The flanges thus engage the opposite sides of the web to guide it properly in its upward travel.

The feed rollers 73 feed the web upwardly between a type roller 74 and a platen roller 75 which constitute a printing couple. Ink is supplied to type roller 74 by an inking roll 76 which is part of an inking unit K (Fig. 1), similar to the inking unit disclosed in Patent No. 1,563,014. As the web passes through the printing couple, successive duplicate impressions of card forms are made on a face of the web. After leaving the printing means, the web passes between a pair of plates 87 (see Figs. 1, 2, 7, and 21) rigidly carried by the furcations 88 of a member 89. Member 89 is mounted, intermediate its length, to the frame for universal rocking movement. At the end opposite plates 87, member 89 has fixed to it a piece of insulation 90 which has point bearing engagement with one end of a thin springy rod 92 of metal which at the other end is rigidly set in a fixed, metal, block 93. Block 93 is fixed relative to but insulated from a surrounding metal sleeve 94, which is insulated from but rigidly fastened to the frame. Near its connection to member 89, rod 92 carries a knurled, metal, disk 95. Block 93 is connected to a conducting wire 96 while sleeve 94 is connected to another conducting wire 97. So long as the web passes freely between plates 87, the spring rod 92 maintains a central, truly horizontal, position with its disk 95 free of sleeve 94. Should the web, after passing the printing means, jam, or be kinked, or be bent out of its plane of feed, the web will not move freely between plates 87 but will press against one or the other plate or against both plates to rock member 89 against resistance of spring rod 92. As member 89 rocks in any direction, it flexes rod 92, causing the disk 95 thereof to engage the sleeve 94. This engagement conductively connects sleeve 94 to block 93 to bridge wires 96 and 97 which are in a circuit, to be traced later, for stopping the machine. As the machine is being stopped, the knife blade 72 (Fig. 1) is operated to cut off the material below the feed rollers 73, thereby preventing any possibility of the web, before its feed has been effectively stopped, from increasing the jam against jam detecting plates 87 and from gathering in folds to jam between the feeding and the printing rollers, conditions which might cause injury to the rollers and to their supporting spindles.

The plates 87 and the means connected thereto thus comprise a jam or kink detecting mechanism to stop the machine and cause the cutting off of the material below the feeding rollers, in the event a kink, jam, or bend in the web is detected above the printing means.

Feed rollers 73 have now fed the web past the printing means and past the jam detector. The feed rollers continue to feed the web, after leaving the jam detector between a pair of rotating and coacting cutter devices. One of these cutter devices comprises a shear holder sleeve 100 fixed to a spindle 101 and rigidly carrying a shear blade 102 (see Figs. 1, 2, 4, 5, 6 and 7). The coacting cutter device includes an integral member comprising end flanges or collars 103a snugly embracing a spindle 104 and fast to the spindle. Integrally connecting the end flanges 103a is a bridge piece 103b concavely curved concentrically with but radially distant from spindle 104. Confined between collars 103a and extending along the length of bridge piece 103b is a sleeve 105 rotatably embracing spindle 104. Sleeve 105 is prevented by engagement of its ends with the confining collars 103a from moving axially along spindle 104, but the sleeve may rock to a limited extent relative to the spindle. Sleeve 105 rigidly carries at one side a shear blade 106 for coacting with blade 102 to shear the web. At the opposite side, collar 105 is formed with a tail 107 projecting above the rear, flat, surface of bridge piece 103b. Between the latter and tail 107 is a spring 108. The spring 108 urges collar 105 clockwise (as viewed in Figs. 5 and 6) until the bottom of shear blade 106 engages the top of a screw 109 adjustably set in bridge piece 103b.

Spindles 101 and 104 of the coacting cutter devices are parallel to each other and to the web, but inclined, as may be understood from Figs. 2, 3, 4 to the direction of feed of the web. Blade 102 is disposed at an angle to its holder and substantially at right angles to the direction of web feed. Blade 106 is disposed along a line inclined to the horizontal and divergent from the incline of its holder 105 so that it is slightly more inclined to its holder than blade 102 to its holder. Each blade is thus wrapped around its holder in the manner of a helix. The upper cutting face of blade 102 is ground spiral (as viewed in Fig. 5) so as to define a line exactly at right angles to the length of the web during rotation of its holder 100 and during uninterrupted feed of the web. Blade 106 is ground flat along its lower surface to act as a die or abutment against which blade 102 shears the web. When the corresponding facing points of the coacting blades 102 and 106 reach the line of tangency of the circles of holders 100 and 103a, then these facing points are in engagement to cut the web. The different corresponding points of blades 102 and 106 from right to left (Fig. 4) along the lengths of the blades reach the line of tangency successively during rotation of their holders. As the holders rotate, the blades travel at the same speed as the web is feeding, and the right hand ends of the blades meet first and start cutting the web at the right hand side. Then, as the shear holders rotate and the web feeds, the blades wipe each other progressively from right to left and shear the web progressively along a straight line from right to left as though by a pair of scissors blades. Due to the slight difference in angularity of the blades 102 and 106 there is a true point contact between the blades as they wipe each other and due to this difference in angularity of the blades and to the blade 106 overlapping the blade 102, the blade 102 during the cutting operation lifts blade 106 against the resistance of spring 108. This insures a positive engagement of the blades at every point of their line of contact with each other and enables blade 102 to determine the line of cut across the web to be at exactly right angles to the length of the web.

In above manner, while the web is feeding upwardly continuously, the blades 102 and 106 cut the web along a straight line at right angles to the direction of feed of the web and to the length of the web. The blades are timed to cut the web at intervals such as to separate the successive impressions of duplicate card forms from each other. The portion of the web above the cutter and which has just been severed along its bottom edge from the rest of the web is now a completed, printed, individual tabulating card T.

At the completion of the cutting operation, and as may be understood from Figs. 5 and 6, the card just formed is no longer under the influence of the feeding rollers 73 or the feeding means below the cutting devices. The web below the last-formed card, however, is being fed positively by the feeding rollers 73 and the upper edge of the web, just formed by the cutting operation is now beginning to move above the cutter blades which are at the same time moving apart and out of cutting coaction (see Fig. 6). The overlap of the cutting blades results, to some extent, during the cutting operation in blade 106 forcing the lower part of the card being formed to the right (Figs. 5 and 6) and out of the plane of the web below.

Thus, at the end of the cutting operation, the lower edge of the card is above and resting on a portion of the blade 102 and the card is moving upwardly due to its own momentum and due to its being fed upwardly by rotation of the latter blade. As the latter blade is also moving to the right (Fig. 6), it is displacing the card to the right at the same time as the card is moving up. The upper edge of the web is beginning to move past the blades but is not in the same plane as the card above. Hence, the web may move past the lower edge of the card without interference from the latter. This enables the web to be fed uninterruptedly at a constant rate without hindrance from the card just formed which may be moving at a slightly slower rate. Thus, exact synchronism in the rate of feed of the card and the web are made unnecessary. The automatic shifting of the card out of the plane of the web below is effected to some extent by the cutter blades 102 and 106 due to their overlap and to movement of blade 102 to the right (Fig. 6), as explained. The main mechanism for shifting the card transversely will now be described.

Referring to Figs. 1, 2, 4, 6, 7, and 9, located above the shearing devices is a card guiding structure comprising a pair of parallel vertically disposed fluted rollers 110. Each roller includes an upper section 110a and a lower section 110b, both sections of a roller being fixed to a shaft 112 which is journaled on the frame. The two sections of each roller have their flutes 110c in vertical alinement, so as to form linear continuations, one of another. The lower, entrance, ends of the flutes of each section are flared to facilitate entry of the card into the flutes. Helical interdental notches 113 are cut in the ribs of the upper sections 110a for cooperating with worms 114 fixed to a horizontal continuously rotating shaft 115 which extends across the back of the fluted rollers. At one end, shaft 115 has a gear 116 operated by the driving means. As the shaft rotates, worms 114 thereon coact with notches 113 to rotate the fluted rollers 110 in opposite directions, as indicated by the arrows in Fig. 9.

Secured to the frame, between the rollers 110, is a flat vertically disposed guide plate 117 which is inclined slightly to extend further forward at the upper than at the lower end.

The normal plane of feed of the web of card material through the feeding rollers 73, printing couple 74—75, and the circular portions of elements 100 and 103a of the shear devices extends centrally of the fluted rollers 110. Flutes 110c of each roller 110 will, during rotation of the rollers, successively arrive at and then pass the normal plane of web feed. A pair of facing flutes 110c, one of each roller, will thus be disposed momentarily along the normal plane of web feed. These two facing flutes are closest to each other at the plane of web feed, and then during continued rotation of the rollers, move forwardly and further apart in divergent directions. When the two facing flutes are closest to each other, at the plane of web feed, they are spaced apart, horizontally, the width of the web plus a slight clearance.

Now, as the web emerges a short distance above the shearing devices, the upper end of the web enters the two facing flutes 110c momentarily along the plane of web feed. As the web continues to move upwardly, before being sheared, the opposite sides of the web are moving within and upwardly along the pair of flutes which have received the web. This pair of flutes thus guides the web during its movement above the shearing devices. As rollers 110 rotate in divergent directions, the pair of flutes engaging the sides of the web move forwardly, thereby forcing the portion of the web above the shears forwardly. The flutes are deep enough to maintain their engagement with the sides of the web during rotation of the fluted rollers through an angular distance slightly greater than the distance between successive flutes on a roller. At the beginning of the feed of the web portion along the facing flutes which have received the web portion, the latter is in the normal plane of web fed, and then as the web portion moves further upwardly along the flutes, it is shifted more and more forwardly by the flutes. For this reason, the guide plate 117 is tilted forwardly at the upper end to maintain guiding engagement with the web portion between the flutes during the feed of the web portion along the entire length of the fluted rollers. The guide plate 117 thus prevents the web from bowing or curving rearwardly between the flutes.

When the upper end of the web portion nears the upper ends of the fluted rollers, the shearing blades 102 and 106 begin shearing the web portion to form an individual card T. The shearing of the web portion to form the individual card is completed when the upper end of the web portion has moved beyond the upper ends of the fluted rollers. During the shearing operation, while the lower edge of the card is still being formed, the portion of the web which is to form the card and which is now above the shearing devices has been bent forwardly or to the right (Fig. 5) by the fluted rollers. Consequently, when the shearing operation is complete and there is nothing further to restrain the lower portion of the card just formed from moving forwardly to a position above the shear blade 102, the lower portion of the card snaps forwardly out of the normal plane of web feed, and the card thus straightens out, in a plane determined by the positions of the flutes now receiving the vertical sides of the card just formed. The lower edge of the card then rests on a point of the shear blade 102, as indicated in Fig. 6, and as the blade continues its clockwise rotation, due to its engagement with the lower edge of the card it feeds the card upwardly. The sides of the card are still within the facing flutes which continue to guide the upward movement of the card and at the same time to further shift the card forwardly or to the right.

In the above manner, the card just formed is immediately shifted forwardly out of the normal plane of web feed so as to avoid interfering with the slightly more rapid and continuous feed of the web portion now moving through the shearing devices and overtaking the card, as indicated in Fig. 6. When the upper edge of the latter web portion reaches the lower ends of the fluted rollers, the pair of facing flutes 110c following the ones guiding the last-formed card are in central position, in the plane of web feed, to receive the sides of the web portion. Thus, successive flutes 110c of the rollers 110 successively come into the plane of web feed to successively receive and guide the web as it moves above the shearing devices.

After the web has been cut to form the individual card and while it is being fed upwardly by the blade 102, gripping means come into play to grasp the card at opposite sides and to thereafter continue the feed of the card for a short distance. The card gripping means will now be described, with reference particularly to Figs. 4, 6, 7, 8, and 9.

Above each fluted roller section 110a, the frame rigidly carries a bracket 120 for rotatably supporting a shaft 122 to extend transversely of the plane of the card T and inclined slightly upwardly towards the card. Mounted on shaft 122 is a yoke 123' which is integral with a gripper arm 123 to which is pinned, by a rivet 124, a coacting gripper arm 125 of thin spring steel. The rear end of arm 125 is forked to straddle shaft 122 and a tongue member 126 locks arm 125 to shaft 122 for common rotation, thereby indirectly locking yoke 123' and its arm 123 to shaft 122.

Yoke 123' is pivotally connected to a dependent bar 127, the lower portion of which is slightly guided in the frame, and the lower end of which engages a cam 128 on shaft 115. A spring 129 connected to bar 127 urges the bar downwardly towards cam 128. Cam 128 is so shaped as to rapidly reciprocate bar 127 which, in turn, oscillates yoke 123' and gripper arms 123 and 125. Since shaft 115 is continuously rotating, the gripper assembly is constantly oscillated.

Gripper arm 125 is formed at its free end with a V-shaped offset which may be considered as the gripping jaw 125'. The inherent resiliency of arm 125 urges it constantly towards arm 123 to engage jaw 125' with the side of arm 123, to grip the card between them. In order to permit the card to enter freely between the jaw 125' and the adjacent gripping end of arm 123, arm 125 is held away from the side of arm 123 until the gripper assembly is about half-way through its rising stroke, or in the lower dotted position shown in Fig. 4. To effect this result, bracket 120 journals, below the gripper assembly and at right angles to shaft 122, a pivot 130 on which is mounted a gripper release lever 132. A hairpin spring 133 between the frame and the bottom edge of release lever 132 urges the latter to rock counterclockwise (Figs. 6 and 7) until the rear end of the release lever abuts a ledge 134 of bracket 120. The forward end of lever 132 is bent to form an angular tip 135 which is in the path of movement of a tab 136 integrally formed with and projecting transversely from the springy gripper arm 125. In the lowermost position of the gripper assembly shown in full lines in Figs. 4 and 6, tab 136 is engaging the horizontal part of tip 135 and by such engagement is holding release lever 132 down in opposition to the urge of spring 133 to move the lever 132 up. Also, the free side edge of tab 136 is abutting the generally vertical part of angular tip 135, and because of this engagement, gripper arm 125 is held away grom gripper arm 123 to permit the upper end of the card to freely enter between jaw 125' and gripper arm 123. Now, as the gripper assembly rises, spring 133 causes lever 132 to rise with its tip 135 following and maintaining engagement with tab 136. During such engagement, the gripper arms 123 and 125 remain spaced apart to freely receive the card. Due to the arcuate path of tip 135, the latter gradually recedes from tab 136, permitting gripper jaw 125' to gradually move towards gripper arm 123 and to finally grip the card just before the gripper assembly reaches its mid-position, shown in dotted lines in Fig. 4. At this time also, the rear end of lever 132 strikes ledge 134 of bracket 120 and can rise no further. Tab 136 of arm 125 now departs from tip 135 of lever 132, and when the gripper assembly is at about the mid-point of its rise, the tab 136 is completely above the vertical part of tab 135 (see Fig. 4).

The card is now gripped at opposite sides and near its upper end by the two gripper assemblies, one above each fluted roller. At the same time, the lower edge of the card is still on shear blade 102 which has meanwhile been feeding the card upwardly after the shearing operation. Cam 128 is of such contour as to cause the gripper assemblies to initially rise at the same speed as the card is being elevated by shear blade 102. Thus, the upper portion of the card, which enters freely between the gripper arms when the latter are in their lower position follows the gripper arms at the initial speed of the latter and remains in position between the arms to be gripped thereby when they close at about the mid-point of their rise.

The gripper assemblies after gripping the card accelerate their speed, thereby instantly withdrawing the lower edge of the card entirely above the locus of rotation of blade 102. This prevents the lower edge of the card from being bent by the shear blade 102 as it rotates rapidly past the plane of the lower portion of the card.

The gripper assemblies deliver the card to a rotary conveyor. Referring to Figs. 1, 2, 3, and 10, the conveyor comprises a wheel or drum 140 fast to a shaft 142 which rigidly carries a gear 143 meshed with the driving mechanism. The driving mechanism, acting through gear 143, continuously rotates drum 140. Spaced equal distances around the circumference of drum 140 are clips 144 (see also Figs. 6 to 8), each to clamp a card against the periphery of the drum. The forward end of each clip is bent away from the drum to facilitate entry of a card into position between the drum periphery and the clip jaw. The clip 144 is pivoted to the rim of the drum by means of a wedge-shaped tip 144a at the rear end of the jaw 144 seating in a V-shaped bearing notch formed in the rim of the drum, there being enough play between the tip and its seat to permit the clip to rock about tip 144a relative to the drum. Ears 144b of the clip straddle the sides of the drum rim and are connected to each other by a wire spring 145 (see Figs. 6 to 8), the ends of which are bent to prevent the spring leaving the clip ears, and the central portion of which engages an inwardly facing annular rib 146 of wheel 140. Spring 145 is bowed by its engagement with rib 146 so as to tend through clip ears 144b, to rock the clip clockwise about tip 144a, to engage the face of the clip with the drum periphery.

Shaft 142 of conveyor drum 140 is parallel to the general plane of movement of the web and of the last-formed card, and the drum is so located and of such size that the right hand arc of travel of the drum periphery (as viewed in Figs. 1, 6, 7, and 10) is substantially a continuation of the plane of the card being fed upwardly by the intermediate delivery grippers 123—125. Thus, the clips 144 will successively pass through the plane of feed of the card to reach a position for receiving a card from the card delivery grippers.

Just prior to reaching the card receiving position, the clip face is moved away from the periphery of drum 140. For this purpose, each clip 144 has one of its ears 144b formed with an extension 149 for cooperating with the bottom of a horizontal lug 148' integrally formed at the upper end of a bar 143 fixed to the frame (see Figs. 4, 6, and 7). As the clip nears card receiving position, its extension 149 moves below lug 148'. Then, as the clip continues to rise, the free, beveled end of the extension engages the bottom of lug 148' and is thereby cammed to the right (Figs. 6 and 7), causing the clip to rock counterclockwise about pivot edge 144a against resistance of spring 145. As a result, the clip face is moved away from the periphery of the conveyor drum and to open position for enabling the upper end of the card to move between the clip face and the drum periphery. The clip remains open while it is moving through card receiving position and then as it continues to rise, extension 149 moves to the right along the bottom of lug 148' gradually permitting the clip to close. By the time the extension has ridden off the bottom of lug 148', as indicated in Fig. 7, the clip has closed and the face of the clip is gripping the card against the drum periphery.

As has been explained previously, the pair of card delivery gripper assemblies 123—125 gripped the last-formed card when about half-way along their ascending stroke. As the grippers continue to rise, the open clip 144 comes to card-receiving position, in which the space between the clip face and the drum periphery is directly above and in line with the central width of the card extending between the pair of gripper assemblies. Thus, as the card is fed upwardly by the gripper assemblies now moving through the upper half of their rise, the upper portion of the card, extending between the pair of spaced gripper assemblies moves into the space between the clip face and the drum periphery. The gripper assemblies continue to rise and move the card further along the clip face while the latter moves through and slightly past card-receiving position. The gripper assemblies gripped the card about half through their rise or when in the lower dotted position indicated in Fig. 4. After gripping the card, the assemblies continue to rise until they reach the upper dotted position. From the lower to the upper dotted line positions, the gripping ends of the gripper arms 123 and 125 move through an arc receding from the sides of the card. Thus, while the grippers are rising and feeding the card upwardly, they are also slipping off the card. About half-way between the dotted positions shown in Fig. 4, the grippers have slipped entirely off the card. Before this happened, the clip has closed and clamped the card firmly against the drum periphery. When the grippers have completely slipped off the card, the latter is gripped only by the clip 144 and will then travel along with the clip which is moving counterclockwise in a circular path.

As previously explained, the grippers 123—125 when in lower, full line position (Fig. 4) are open and receive the upper part of the card at each side of the latter. Then while moving from the full line to the middle, dotted line, position, the grippers travel at substantially the speed of the card which is moving upwardly due to its own momentum and the engagement of its lower end with the rising knife blade 102. When the grippers grip the card, they start moving more rapidly so as to snap the card completely away from the path of knife blade 102. After gripping the card, the grippers feed it into the bite of a clip 144 and while so doing move more rapidly than the clip so as to effectively advance the card further into the range of the clip face. Then the clip grips the card, and during the interval in which both the clip and the grippers 123—125 grip the card, the grippers move at substantially the speed of the clip. The different speeds of the grippers are obtained by properly shaping cams 128 which control the rise of the grippers.

As stated in the detailed description of the gripper assemblies, gripper arms 123 and 125 are mounted on a shaft which is disposed at an incline to the plane of feed of the card. Thus, as the gripper assemblies rise, they move in a slightly inclined path, inclining rearwardly away from the card surface. The portion of the card below the grippers is being restrained at the sides by engagement with the pair of flutes 110c guiding the card. Due to rotation of the fluted rollers, these guide flutes are moving the card forwardly or to the right (Figs. 6 and 7). After grippers 123 and 125 grip the card, the flutes continue to shift the main part of the card forwardly, but the upper part of the card now is constrained by the grippers to move in the path traversed by the grippers. As the grippers move upwardly along an inclined path which recedes further behind the plane of the main part of the card the further the rise of the grippers continues, the upper part of the card above the fluted rollers is flexed rearwardly of the plane of the part of the card moving along the fluted rollers (see Fig. 7). The clip 144 receives the upper portion of the card from the grippers while this upper card portion is being flexed to the rear by the grippers. Then the clip 144 clamps the upper portion of the card intermediate the pair of spaced gripper assemblies. The clip now moves forward or to the right (Fig. 7) in the same direction as that in which the main body of the card is being moved by the flutes 110c while the gripper assemblies continue their rise in an inclined path rearwardly of the clip. Consequently, before the gripper arms 123 and 125 release the sides of the card, they are flexing the sides of the upper portion of the card to the rear while the portion of the card intermediate the gripper assemblies is being moved forwardly both by the fluted rollers and the clip 144 and drum 140. As a result of this relative movement between the gripper assemblies and the clip 144, the upper portion of the card is bowed along its width, as indicated in Fig. 7. With the card thus bowed, the gripper assemblies reach a point of their upper arc of rise at which they slip off the sides of the card and release it. Immediately, the card unbows, as a result of which the sides of the upper part of the card snap forwardly out of the path of travel of the grippers. The flutes 110c are still engaging and continuing to move the lower part of the card forwardly while the upper part of the card is being moved forwardly by the clip 144. Consequently, after the grippers release the card and the card unbows, the entire card continues to move out of the path of descent of the grippers. Thus, the return, descending stroke of the grippers may follow the upward stroke immediately, without encountering or being interfered with by the card, all portions of which have now been removed from the path of travel of the grippers by the fluted rollers acting in conjunction with the clip 144.

During descent of the gripper assemblies, lug 136 of gripper arm 125 encounters angular tip 135 of release lever 132 and as the lug moves along the vertical side of tip 135, the latter forces the gripper arm 125 to the right (Fig. 6) away from gripper arm 123. After this, lug 136 engages the horizontal side of tip 135, so that for the rest of the down stroke of the gripper assembly, arm 123, through its lug 136, forces the lever 132 downwardly against resistance of spring 133. The parts are then in initial positions, ready to receive the card behind and following the one just delivered to the drum conveyor 140.

In above manner, the cards are delivered to the successive clips 144 of conveyor wheel 140 to be conveyed by them away from the card printing and severing section of the machine. The successive cards carried by clips 144 after rollers 110a—110b have released the sides of the cards and while along the upper right quadrant of the locus of travel of the conveyor drum 140 hang down from the clips and lie in divergent planes. These planes diverge because the cards are gripped at different points of the drum to which the cards tend to lie tangent. Further, the cards are held in divergent planes, positively spaced apart while they are pendant from the clips by engagement between the underside of one card with the outer face of the clip beneath the card and following the clip which is gripping the card at its upper end. While the cards are traversing the upper arc of the conveyor path, they are in generally horizontally directed positions, at which time they are held apart by engagement of one card with the upwardly turned end of the following clips. The cards continue counterclockwise with the conveyor drum 140. When they arrive at the left side of the locus of the conveyor wheel, the cards extend upwardly from their holding clips 144 (see Figs. 1, 11 and 13). While a card is thus standing vertically with its inner edge gripped by a clip, the clip extension 149 rides onto an upper, inclined, surface of a block 160 which cams against the clip extension to rock the clip counterclockwise (as viewed in Fig. 11), thereby opening the clip slightly. The clip thus releases its grip on the lower end of the card, permitting the card to drop by gravity until the lower, inner edge of the card abuts the then upper edges of the clip ears 144b. In above manner, as a clip passes block 160, it opens sufficiently to permit the card to drop to a definite, predetermined, position on the clip. When the clip extension 149 rides off the upper inclined surface of block 160, the spring 145 recloses the clip to again clamp the lower end of the card. Thus, after the clips pass block 160, the cards are set in the clips in definite, similar predetermined, positions. The outer edges of the cards now ride along a curved plate 162 which prevents the cards, due to their weight, from flexing or bending downwardly about the clamped inner end, and maintains them substantially tangential relative to the periphery of the conveyor drum 140 and with their surfaces spaced apart.

The purpose of setting the cards in definite positions relative to their holding clips 144 is to cause each card to extend the same predetermined distance from the rim of the conveyor wheel 140 when the card arrives at a corner clipping mechanism 165 (which need not be described herein) and, subsequently, at the stacking mechanism. After its corner is cut off, the card continues downwardly, with its outer edge riding along the incline of a guide plate 190 (see Figs. 1, 11, 13 and 14). The inner end of the card, held by a clip 144, has portions projecting horizontally to either side beyond the clip and the sides of the conveyor drum 140, as indicated in Fig. 8. While the outer end of the card is moving along plate 190, the right hand laterally projecting portion (as viewed in Fig. 8) of the inner or lower end of the card engages one of the ten equally spaced paddles 192 of a disk 193 (see Figs. 11, 13, and 16). The hub of disk 193 is rotatably mounted on a stud 194 fixed to the frame. Surrounding stud 194 between the frame and the adjacent end of the hub of disk 193 is a coil spring 195, the pressure of which prevents accidental rotation of the disk.

Figures 11, 12:
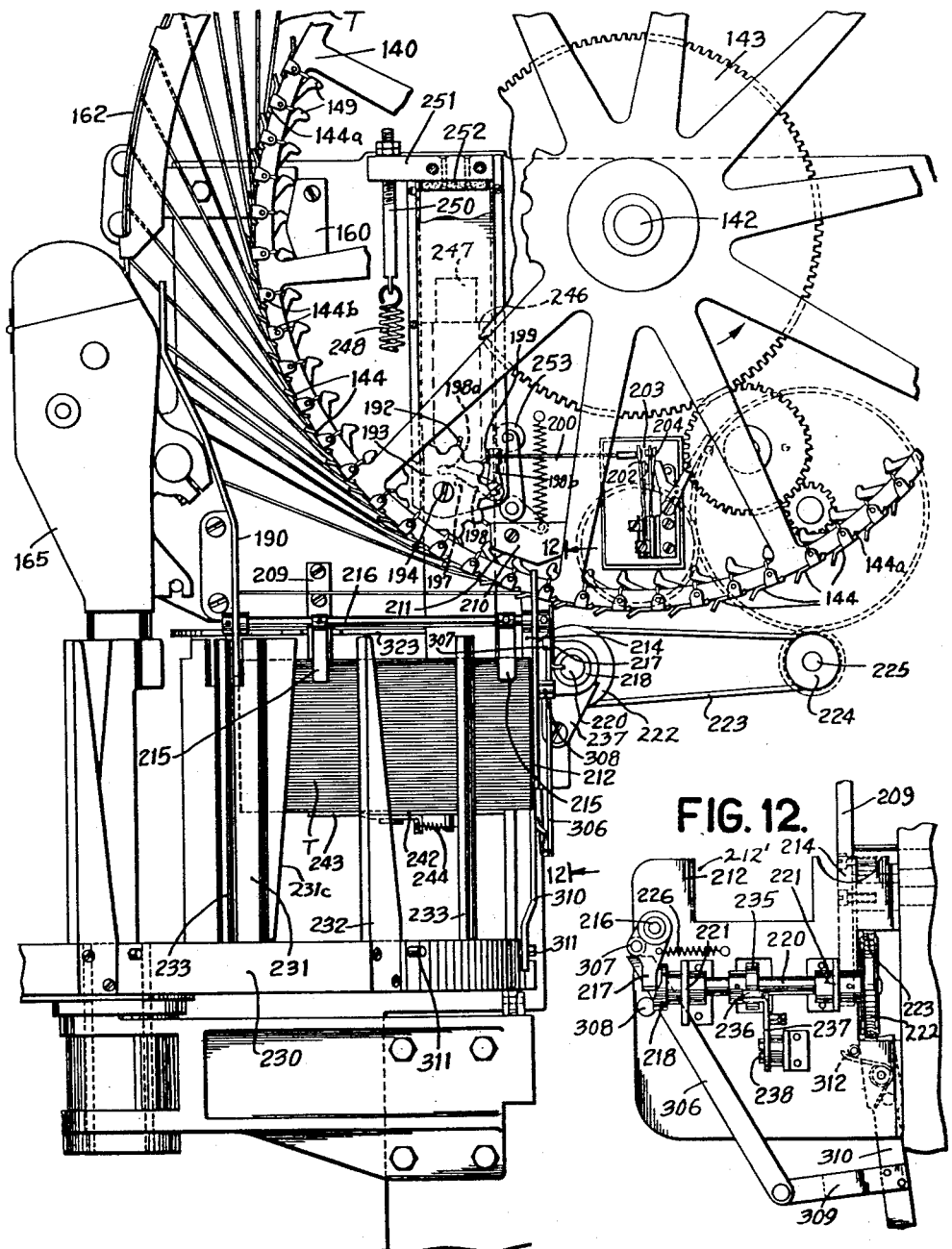
Fig. 11 is an enlarged view of the upper left portion of Fig. 1.
Fig. 12 is a detail view taken as indicated by arrows 12—12 of Fig. 11.

As a card moves with conveyor drum 140, past the corner clipper, the inner edge of the card meets a paddle 192 to rotate disk 193 one-tenth of a revolution counterclockwise (Fig. 11). Projecting transversely from the side of disk 193 is a stud 197. At each revolution of the disk, stud 197 rides under and past the free cam-shaped end of an arm 198a of a bell crank lever 198 to rock the bell crank lever clockwise. The other arm 198b of the bell crank lever is bent at its upper end to form a lug 199 engaging one end of a push rod 200. The opposite end of rod 200 has an insulating tip engaged with a spring blade 202. Blade 202 carries one of the points of a switch 203, the other point being on a blade 204. When the bell crank lever is rocked clockwise, it pushes rod 200 to the right, against resistance of spring blade 202 to close switch 203.

In above manner, ten cards successively passing paddle wheel 193 effect a single revolution of the wheel, causing its stud 197 to cam lever 198 clockwise to move rod 200 to the right for momentarily closing a switch 203.

Switch 203 when closed energizes magnet 205 (see the circuit diagram, Fig. 25) for operating an ordinary Veeder counter 206 (Fig. 1) to add "1" to the reading of the counter. The total number of cards actually passing the wheel 193 is then obtained by multiplying the counter reading by ten.

As the card travels past disk 193, its rear long edge starts moving down in front of a vertical bar 209 secured to the frame (see Figs. 11 and 14). At this time, the left edge of the card is traveling along guide plate 190, the rear long side is traveling along bar 209, and its right end is gripped by a clip 144.

Before a card reaches a horizontal position, the clip carrying the card is released from the card and held released until the card drops by gravity into a stacker. The release of the clip from the card is effected by a stationary block 210 (Figs. 11 and 13) having an inclined cam surface 211 which meets the extension 149 of the clip, and cams the clip extension downwardly to rock the clip counterclockwise. This action of the clip frees it from the inner, or right hand side (Fig. 11) of the card. Extension 149 continues to ride along the cam surface of block 210 to maintain the clip released from the card until the clip completely departs in a horizontal direction from the right hand or inner end of the card. At the moment of release of the card, its clip 144 is passing through a slot 212' of a vertical plate 212 (Figs. 11, 12, 13 and 14), and the card is substantially horizontal with its right hand edge, at either side of the clip, abutting the portions of plate 212 at opposite sides of slot 212'. Thus, as the clip continues its movement towards the right and passes freely through slot 212', the plate 212 positively prevents the card from following.

When the clip leaves the card, the latter drops, with its left, short, side edge (Figs. 11 and 14) guided by plate 190, its right edge by plate 212, and its rear long edge by bar 209 and a parallel bar 214 secured to plate 212. As the card falls along these guide elements, means are provided to aline the card in one direction by pushing the card towards the bars 209 and 214 to positively engage the rear long side of the card with the latter bars. This is done by means including a pair of flappers 215 (see Figs. 1, 11, and 14) secured to a shaft 216 (also see Fig. 12) journaled between plates 190 and 212 to extend parallel to the front of the bars 209 and 214. At its right end, shaft 216 rigidly carries an arm 217, the lower end of which engages a face cam 218 mounted on the end of a shaft 220 journaled by spaced, parallel, brackets 221 secured to the plate 212. Shaft 220 extends at right angles to shaft 216 and at the end opposite face cam 218 is provided with a pulley 222 which is connected by a driving belt 223 to the pulley 224 fast to a shaft 225 (also see Fig. 3) of the driving train. During operation of the driving train, it acts through shaft 225, pulley 224, belt 223, and pulley 222 to continuously rotate shaft 220. Face cam 218 on shaft 220 is thus repeatedly acting on arm 217 of shaft 216 to rock the latter shaft clockwise (Fig. 12) against resistance of a spring 226 connected to arm 217. The spring returns shaft 216 counterclockwise, during which time, flappers 215 on shaft 216 move towards the front long edge of the card to engage the card for pushing its rear long edge flat against the alined surfaces of bars 209 and 214. Thus, flappers 215 are continually, rapidly and repeatedly oscillated, being moved during one stroke under the influence of spring pressure—by spring 226— towards the cards to move the cards into engagement with the faces of bars 209 and 214. In this manner, the cards are alined in the direction of their width as they drop into a pocket of a stacker table 230 (see Figs. 1, 2, 3, 11, 14, 15, 17 and 18).

The stacker table, for present purposes, has eight card receiving and stacking pockets. To form the eight pockets, the stacker table rigidly carries eight angle bars 231, eight bars 232, and eight rods 233. Each pocket is defined by the bent face or wall 231a (see Figs. 14 and 17) of one angle bar for engaging the left, short, side of the card, the back of a wall 231b of the following angle bar for engaging the rear long side of the card, a bar 232, and a rod 233.

When a stacker pocket is at the card receiving station, the bent wall 231a of an angle bar 231 is in the same vertical plane as the vertical lower portion of guide plate 190 (see Figs. 14 and 23), and the wall 231b of the following angle bar is slightly behind the vertical plane of guide bars 209 and 214 (also see Fig. 13). The lower end of guide plate 190 is cut away, as indicated in Fig. 23, to permit wall 231a to move into position below the guide plate and into the plane of the guide plate and also to permit the wall 231a to subsequently move freely past the guide plate. At the side of the cut away or recessed lower end of plate 190, the latter is formed with a depending projection 234 which extends vertically downward below the top of wall 231a. Thus, the lower portion of guide plate 190 and bent wall 231a occupy positions side by side in the same plane to engage the left, short, edge of a card (as viewed in Figs. 11 and 14) as the card drops into the stacker pocket.

As indicated in Figs. 13, 14, and 17, wall 231b is cut away to accommodate the lower part of guide bar 209. This permits the portions of the wall 231b at either side of the cut out portion to occupy positions at either side of bar 209.

As the cards drop along the defining elements of the pocket in receiving position, they are also alined lengthwise, at right angles to the direction in which they were alined by flappers 215. To aline the cards lengthwise, shaft 220 carries a peripheral cam 235 (Figs. 12, 13 and 14) engaged by the lug 236 formed at the rear of a plate lever 237 pivoted on a pin 238 mounted to plate 212. At its forward end lever 237 rigidly carries a pad 239 which projects through a hole formed in plate 212 for the purpose of engaging the right hand, short side edges of the cards. Cam 235 positively rocks plate lever 237 clockwise (Fig. 13) to retract pad 239 from the cards while a spring 240 connected to the plate lever returns the plate lever counterclockwise to engage the right hand edge of the cards for pushing them towards the left. Thus, the pad 239 is repeatedly and continuously oscillated and during its spring-impelled strokes intermittently strikes the cards to engage the left edges of the cards with the pocket wall 231a and the guide plate 190. The card is thus alined in two directions at right angles to each other, in one direction by flappers 215 and in the other direction by pad 239. The cards will thus be evenly stacked in each receiving pocket of the stacker table.

The cards as they stack up in the pocket located in receiving position, are supported by a platform comprising a pair of horizontal plates 242 and 243 (Figs. 1, 11, 14, and 17). Plate 243 is pivotally carried by plate 242 and is urged by a spring 244 connected to the two plates to remain in clockwise position (Fig. 14) against a stop pin 245 on plate 242.

Plate 242 is fastened to a carriage 246, at the lower end of the latter. The carriage 246 extends vertically and is divided to straddle a vertical rail 247 fixed to the frame. The carriage is mounted, through ball bearings, on rail 247 for vertical, slidable, movement. A coil spring 248 extends vertically alongside carriage 246, and is connected at its lower end to a bracket 249 fixed to the carriage and at its upper end to a rod 250 threaded in a block 251 secured to the frame. The rod 250 may be adjusted relative to block 251 to adjust the tension of coil spring 248 and thereby the amount of weight required to move the platform through its vertical stroke, from upper position, in which the top of its carriage 246 is against a leather bumper 252 to the lower position in which the platform is below the card supporting surface of the table, as shown in Fig. 17.

Coil spring 248 acts as an automatic weight counterbalance and stretches in accordance with the weight of a card stack on the platform plates 242 and 243. The weight of the card stack corresponds to the number of cards in the stack. Initially, when the platform 242—243 is not loaded with any cards, the carriage and platform will be in uppermost positions under the influence of counterbalance spring 248. Then as the cards drop into the pocket in receiving position and onto the platform, the weight of the cards will lower the platform against resistance of spring 248. When the stack has a desired number of cards, as determined by weight, the platform has been depressed to its lowermost position in which the plates 242 and 243, comprising the platform, lie below the surface of the stacker table.

Engaging the right side of carriage 246 is a roller 253 (see Figs. 11, 14 and 22) carried by the free end of an upright arm 254 secured to one end of a horizontal shaft 255. A spring 256 connected to arm 254 urges shaft 255 counterclockwise (Fig. 22) but this movement is normally limited by engagement of roller 253 with the right side of carriage 246. When the weight of cards resting on platform 242—243 has lowered carriage 246 to its lowest position (Fig. 17), then the top of the carriage side reaches roller 253. The roller thereupon is moved by spring 256 above the top of the carriage side, resulting in the rocking of shaft 255 counterclockwise (Fig. 22).

Shaft 255 by its counterclockwise movement controls means to rotate stacker table 230 one step to move the filled pocket away from receiving position and to bring the following empty pocket to the receiving station. The control by shaft 255 will now be explained. Referring to Figs. 14 and 19, shaft 255 carries a detent 260 which in the normal, clockwise, position of the shaft engages the tail of a clutch pawl 261 to hold the pawl released from a tubular driving clutch member 262 (also see Fig. 20). Pawl 261 is pivotally carried by a driven clutch disk 263 and urged by a spring 264 between the disk and pawl to engage the teeth 265 cut in the tube 262. The spring 264 is ineffective while detent 260 is engaging the tail of pawl 261. When roller 253 moves above the top of carriage 246, then shaft 255 rocks counterclockwise (Figs. 19 and 22), withdrawing detent 260 from pawl 261, the nose of which thereupon engages a tooth 265 of driving clutch member 262. Driven disk 263 is now coupled for rotation to driving member 262.

Driven disk 263 is secured to the upper end of a vertical shaft 266 journaled in the upper and lower walls of a casing 267 fixed to the frame. Driving clutch tube 262 surrounds shaft 266 and is securely fastened to the hub of a worm gear 268. The hub of gear 268 encircles shaft 266 and is journaled for rotation thereby. At the same time, the hub of gear 268 rests on top of a bearing bushing 269 (see Fig. 20) located between casing 267 and shaft 266. Worm gear 268 is continuously rotated by a worm 270 fastened to a shaft 272 journaled on casing 267. Shaft 272 carries outside casing 267 a gear 273 which is in the driving gear train (also see Fig. 3).

When detent 260 releases clutch pawl 261, the latter moves into engagement with a tooth 265 of the tubular driving clutch member 262 which is continuously rotating with worm gear 268. Driven clutch disk 263 and its shaft 266 are now coupled for rotation to member 262. During one revolution of shaft 266, the stacker table 230 is rotated one step, removing the filled pocket from the receiving station. As the filled pocket moves out of the receiving station, the back wall 231b of this pocket which was just behind the faces of bars 209 and 214 moves against the rear long edges of the cards so as to move the card stack along with the pocket and off the platform 242—243. Consequently, with the platform unloaded, coil spring 248 raises carriage 246, thereby displacing roller 253 from the top of the carriage and forcing shaft 255 to return clockwise (Fig. 19) to its normal position. This happens while the driven clutch disk 263 is making one revolution. Thus, at the end of the revolution, detent 260 carried by shaft 255 is in normal position, intercepts the tail of clutch pawl 261, and releases the nose of the pawl from driving member 262. The engagement of detent 260 with pawl 261 thus stops the pawl and its carrying disk 263 from further rotation with the driving mechanism. Likewise, the driven shaft 266 of disk 263 and the means associated therewith are arrested in their initial positions at the end of one revolution of shaft 266.

Referring to Figs. 19 and 20, driven shaft 266 carries at its lower end, external to casing 267, a cam 275 engaged by the roller 276 at the end of a follower arm 277 fixed to the upper end of a vertical shaft 278 (see also Fig. 14). Fastened to the lower end of shaft 278 (see Figs. 15 and 17) is an arm 279 connected at its rear end to a spring 280 which serves to urge shaft 278 counterclockwise (Figs. 14 and 15) thereby maintaining roller 276 against the periphery of cam 275.

Arm 279 is connected by a link 282 to a horizontally disposed plate 283 which is located between a shoulder 285 (Fig. 17) of hub 284 of stacker table 230 and the top of a ratchet disk 286, rigidly fastened to hub 284. Disk 286 has eight ratchet teeth 286a corresponding to the eight pockets of the stacker table. An actuating pawl 287 is pivotally mounted on plate 283 to engage teeth 286a of disk 286. Between pawl 287 and plate 283 is a spring 288 for holding the nose of pawl 287 in engagement with disk 286.

During the one revolution of driven shaft 266, its cam 275 rocks follower arm 277, its shaft 278, and arm 279 thereof clockwise (Figs. 14 and 15). As arm 279 rocks clockwise, through link 282, it similarly rocks plate 283, causing the pawl 287 to abut the abrupt, radial, end of a tooth 286a of disk 286 and thereafter to turn disk 286. Since disk 286 is fixed to the hub 284 integral with stacker table 230, the rotation of disk 286 is communicated to the stacker table. The step of rotation of stacker table 230 is determined by the stroke of pawl-carrying plate 283, which, in turn, is governed by the contour of cam 275. The movement of plate 283, as governed by cam 275, is slightly more than one-eighth of a circle, but pawl 287 does not engage the abrupt side of a tooth 286a until after the plate 283 has moved a slight amount. Thereafter, pawl 287 acts on the tooth 286a engaged thereby to rotate disk 286 and the stacker table for one-eighth of a revolution.

On the return stroke of plate 283, pawl 287 ratchets over a tooth 286a and at the end of the return stroke is safely behind the back of the tooth.

In above manner, during the one-revolution of driven shaft 266, stacker table 230 is given one-eighth of a turn. There are eight pockets on the table, so that during this eighth turn, the filled pocket is moved out of the card-receiving station and the following empty pocket moved to the receiving station.

It may be noted that as the stacker table is being rotated, the stack of cards on platform 242—243 prevents rise of the platform until the stack is entirely off the platform. At the time the stack leaves the platform, the wall 231b of the angle bar 231 engaging the rear long edges of the cards of the stack has just passed the extremity of platform plate 243 and the inclined edge 231c (see Fig. 17) of this bar is directly across this platform plate and in its path of upward movement. Consequently, the platform rise is now governed by its engagement with the aforesaid inclined edge. As the stacker table completes its step of rotation, the inclined edge gradually withdraws from the platform and during its withdrawal, the platform rises with plate 243 engaging the inclined edge until this edge is completed past the platform plate. Thus, engagement of the platform with edge 231c governs rise of the platform, causing the rise to be effected gradually and concomitantly with rotation of the stacker table.

Means are provided to prevent overthrow of the table during its rotational step and to positively arrest the table when its step has been completed. The overthrow-preventing means includes a rod 290 pivotally connected at one end to table actuating plate 283 and passing through an opening in a lever 291 (see Figs. 15, 17 and 18). Lever 291 is a plate formed with a wide central portion through holes in which studs 292 pass with clearance to pivotally mount the lever on a fixed bracket 293. The end of lever 291, opposite the end through which rod 290 passes, is bent to provide a lug 294 (Fig. 15) for engaging the rear wall of a notch 295 formed in the rim of the stacker table 230 and a part of which is occupied by the bar 232 which forms a defining element of a card stacking pocket. There are eight such notches 295, one for each of the bars 232 of the eight card pockets.

At opposite sides of plate lever 291 and encircling rod 290 are a pair of springs 296 and 297. Spring 296 lies between lever 291 and a ring 298 fastened to the free end of rod 290 while spring 297 lies between a similar ring 299 and the plate lever.

In the initial position of table-actuating plate 283, spring 296 is effective to hold lever 291 in a position in which the lug 294 thereof is completely outside notch 295 and remote from the rim of stacker table 230. Spring 297 is normally loose between lever 291 and ring 299.

During the cycle of one-revolution shaft 266, cam 275 causes clockwise movement (as viewed in Fig. 15) of plate 283, as previously described, to effect a step of rotation of stacker table 230. As plate 283 moves clockwise, it forces rod 290 to the right. During this movement of rod 290, its ring 299 compresses spring 297 while ring 298 recedes from spring 296, thereby gradually lessening the resistance of the latter spring. During this time, table 230 is being rotated clockwise, and before the notch 295 of the pocket being moved to card receiving position reaches lug 294, the spring 297 has been sufficiently compressed to overcome the resistance of spring 296 to clockwise movement of lever 291. Until the table has nearly completed its rotational step, lug 294 rides on the arc of the table rim between successive notches 295. Then, when the table 230 has nearly finished its step of rotation, the next notch 295 reaches lug 294 which immediately springs into the notch to engage the rear wall of the notch and positively stop rotation of the table when the rotational step of the table is complete and the next empty pocket is in card-receiving position.

The actuating plate 283 then returns in a counterclockwise direction (Fig. 15), actuating rod 290 to the left. During this return movement of the rod, the force of spring 297 on lever 291 gradually lessens while the power of spring 296 increases to restore lever 291 to initial position with lug 294 external to the rim of stacker table 230.

To impositively retain the stacker table in position, each bar 232 of a stacker pocket is V-notched in the bottom (see Figs. 15, 17, and 18) to receive a roller 300 carried by the upper end of a plunger 302 slidably mounted in a socket 303 formed in the outer end of the bracket 304 fixed to the frame. Bracket 304 is formed with a collar 304a journaling hub 284 of the stacker table and supporting the table by engagement with the under surface of ratchet ring 286.

Within socket 303 and acting on plunger 302 is a spring 305. When a stacker pocket is at receiving station, the V-notched bottom of bar 232 is above roller 300 and spring 305 is holding the roller seated in the V-notch. By the means, the stacker table is releasably maintained in the position to which it has been moved by operation of actuating plate 283.

During the step of rotation of the stacker table, if, for any reason, the platform 242—243 is above the card supporting surface of the table before the rear wall 231b of the last-filled pocket has passed the platform, then the wall 231b will engage the inclined front edge of plate 243 and will cam the plate counterclockwise (Fig. 14) about its pivotal connection to plate 242 and against resistance of spring 244. This permits the wall to pass the platform under the stated condition, during the step of rotation of the stacker table.

During rotation of stacker table 230, it is desirable to raise flappers 215 out of the way of the front edge of the advancing stack of cards. For this purpose, the top of a bar 306 outside of guide plate 212 underlies a stud 307 (see Figs. 11 and 12) on arm 217 of shaft 216 of flappers 215. The bar 306 rests on a pin 308 along which the bar is adapted to slide. At its lower end, link 306 is pivoted to one end of an extension 309 of a lever 310 (also see Fig. 17). Lever 310 is pivoted at its upper end to guide plate 212 and has its lower portion projecting into the path of travel of the pins 311, each extending horizontally from the periphery of the table 230 adjacent each pocket defining bar 232. When a pocket is in card receiving position, pin 311 is in the rear of lever 310. When the stacker table rotates, pin 311 engages lever 310 and rocks the latter clockwise (Fig. 12) against resistance of a bent spring 312 looped around the pivot of the lever. When lever 310 rocks clockwise, it raises bar 306 the top of which engages stud 307 to rock arm 217 and its shaft 216 clockwise, thereby raising flappers 215 above the top of the card stack. After the front edges of the card stack have passed flappers 215, pin 311 rides off lever 310 and the flappers may then return to normal positions when the rear end of the stack has passed.

During the step of movement of the stacker table, before the empty pocket following the last-filled one reaches the card receiving station, the cards continue to drop from the conveying drum 140 along the guide plates 190 and 212 and the bars 209 and 214. There is no pocket in place, as yet, to receive these cards, and means are provided for catching these cards and holding them until the stacker table has finished its step of rotation and until the next empty pocket is at receiving station. The means for catching the cards during the transition from one pocket to the next is under control of the one-revolution shaft 266.

Near the lower end of shaft 266 (see Figs. 14, 19, and 20), the shaft rigidly carries a cam 315. Engaging the cam 315 is the free end of a follower arm 316 integral with a sleeve 317 rotatably supported by a vertical shaft 318 fixedly carried by casing 267. Extending integrally from sleeve 317 oppositely to follower arm 316 is an arm 319 pivotally connected to the lower end of a rod 320 which freely passes through a bracket 321 secured to casing 267. Encircling rod 320 is a coil spring 322 urging arm 319 and sleeve 317 counterclockwise (Fig. 14) to maintain follower arm 316 engaged with cam 315.

During the cycle of one-revolution shaft 266, the latter rotates counterclockwise (Fig. 14) and its cam 315 moves in the same direction. Cam 315 is so contoured as to permit a rapid movement of follower arm 316 from the outer end of the cam to the hub of the cam. Thus, as cam 315 retreats from sleeve 317, spring 322 acts to rapidly rotate sleeve 317 counterclockwise.

Fastened to the bottom of sleeve 317 is an arm 323 consisting of a flat plate the outer or free end of which is enlarged and bifurcated, with each furcation 323a projecting transversely and forwardly of the body of the arm.

The furcations 323a serve as a card catcher. Before the cycle of one-revolution shaft 266 begins, the furcations are external to the card receiving station, as indicated in full lines in Fig. 14. When the one-revolution cycle of shaft 266 takes place, the loaded pocket at the receiving station moves away and the following, empty, pocket moves to the receiving station. At the beginning of the cycle, cam 315 retreats to permit rapid movement of sleeve 317 counterclockwise, thereby quickly placing the furcations 323a, constituting a card catcher, within the card receiving station, as shown in dotted lines in Fig. 14. Thus, the furcations 323a immediately at the beginning of the cycle are located at the card receiving station to catch the cards dropping from the conveyor drum 140 during the interval in which the loaded pocket is moving out of card-receiving position and in which the next, empty, pocket is moving towards but has not yet reached the card-receiving position.

As indicated in Fig. 11, the card catcher is in a horizontal plane clear above the top of pocket defining elements 231a and 231b so as not to interfere with the movement of the elements. At the same time, the plane of the card catcher intersects the card guiding bar 209 and the lower portion of guide plate 190.

However, the space between furcations 323a of the card catcher receives bar 209 as the catcher moves to the card receiving station, so that bar 209 does not interfere with movement of the catcher. Also, the lower end of guide plate 190 is cut away along the path of movement of the card catcher so as not to interfere with movement of the catcher. When the card catcher is at the receiving station, the bar 209 is seated in the crotch between the rear furcation 323a and the connecting bridge between the furcations so as to abut and guide the rear long edges of the cards as they drop into the card receiving station and onto furcations 323a. At the same time, depending projection 234 of guide plate 190 (see Fig. 23) extends above the catcher plane to abut and guide the left edge of the cards. Thus, during the transition from one stacker pocket to the next, the cards fall onto the card catcher furcations 323a in the same formation as when they are dropped directly into a stacker pocket.

Near the end of the cycle of shaft 266, when the empty stacker pocket has already reached the card receiving station, cam 315 comes around to follower arm 316 and rapidly moves the latter to rock sleeve 317 clockwise (Fig. 14). Thus, the card catcher 323a is quickly withdrawn to the rear of the card receiving station. As the catcher retreats from the card receiving station, bar 209 and plate 190, respectively engaging the rear long edges and the left hand short edges of the cards on the catcher, prevent the latter cards from following the catcher, and when the catcher has completely withdrawn, these cards drop down in alinement into the pocket now at the card receiving station.

A stacker pocket should be unloaded by the operator before it again reaches the load receiving station. In the event the operator neglects to do this, automatic means are provided to stop the machine. When a loaded stacker pocket moves to a position two steps of rotation, behind the card receiving station, the card stack in this pocket engages the upper end of an arm 328 (see Figs. 3 and 14) secured to pivot stud 30'. As previously explained, pivot stud 30' dependently carries arm 31 connected intermediately to rod 32, which carries insulating plate 32'. As the table moves, the stack of cards engaged with arm 328 forces the arm to the right (Fig. 3), thereby rocking pivot 30' and dependent arm 31 clockwise. As a result, rod 32 and plate 32' move to the left, causing the plate to open contacts 34. This stops the machine, as will be explained later in connection with the circuit diagram, Fig. 25. To allow the machine to resume operations, the operator must first remove the stack of cards abutting arm 328.

The opening of contacts 34 by the rocking of arm 328 by engagement with a stack of cards has just been explained. Previously, it was explained how the web, if too thick, would be unable to pass through the slot of plate 27 of the thickness detector, which would cause actuation of bar 32 to the left to effect opening of contacts 34 to stop the machine. In addition, means are provided to open contacts 34 when the supply roll 10 of material C is depleted. Referring to Fig. 1, the periphery of the supply roll 10 is engaged by a stud 340 extending from the free end of an arm 341 fast to a shaft 342 (also see Fig. 3). On this shaft is the previously mentioned arm 35, the outer end of which is curved and adapted to engage either the upper stud 36 or a lower stud 343 both provided on arm 31 connected to switch-opening bar 32. On arm 341 is pivotally mounted a harpoon latch 346, the left side of which is adapted to rest on a fixed pin 347 for retaining arm 341 in upper position. In the upper position of arm 341, the curved free end of arm 35 is engaging stud 36 and by this engagement holding arm 31 and bar 32 to the left, as indicated in Fig. 3, so that switch 34 is open. In this upper position of arm 341, its stud 340 is outside the circle occupied by a full supply roll 10 when the letter is taken from stock. Thus, a new roll of card material may be placed on spool 11 without interference from stud 340, and during this time, contacts 34 are open to prevent the machine from running. When the new supply roll 10 has been placed in position, the operator unhooks member 346 from pin 347, permitting arm 341 to drop until stud 340 engages the periphery of the supply roll. The machine is then started, and the stud 340 follows the periphery of the supply roll as the size of the roll diminishes. When the roll is nearly exhausted, arm 341 moves to its lower limit in which the curved end of arm 35 cams against stud 343 to move arm 31 to the left, causing contacts 34 to open and stop the machine. Thus, when supply roll 10 is practically exhausted, the machine automatically stops. As arm 341 moved to its lower limit, the harpoon latch 346, hanging vertically, passed a stud 348. To take care of a final residue of material remaining on spool 11, the operator lifts arm 341 and rests latch 346 on fixed pin 348. As arm 341 was lifted, arm 35 released pin 343 of arm 31, permitting contacts 34 to close and the machine to resume operation under the immediate supervision of the operator. To place a new roll in position, arm 341 must be lifted to its upper position where arm 35 cams against stud 36 to move arm 31 to the left for opening contacts 34 to prevent starting of the machine while the supply roll is being set in place.

In addition to the means described above for printing matter on the cards, means are also provided to make a stripe S (Fig. 24) along the lower edge of the cards, the striping being done for rough classification purposes. The striping means need not be described herein, being the subject matter of a divisional application.

The machine is powered by an electric motor

M (Figs. 1, 2, 3) mounted on a base plate 375 hinged by a rod 376 to the top of the frame. A pulley 377 on the motor shaft is connected by a driving belt 378 to a pulley 379 on a shaft 380. Pulley 379 drives the various gear trains for actuating the several mechanisms of the machine described hereinbefore.

A link 382 is connected at its upper end to base plate 375 of motor M and at its lower end to a lever 383 having an arm 383a extending horizontally. Lever 383 is fixed to a shaft 384 provided with a manual operating rod 385. When the machine is running, arm 383a is supported by the top of the vertical arm of a bell crank latch 386. In this position of arm 383a, lever 383 is at its counter-clockwise limit, link 382 is raised, and base plate 375 of motor M is rocked clockwise about hinge pin 376. As a result, driving belt 378 is tightened to communicate rotation of motor shaft pulley 377 to driven pulley 379 for the various gearing.

When latch 386 is rocked clockwise (Fig. 3) the upper end of the latch slips off arm 383a, permitting the arm 383a to drop to the position shown in Fig. 3. Correspondingly motor M drops of its own weight, thereby loosening belt 378, disabling it from driving pulley 379. This disconnection of the motor from the driven mechanism occurs when the motor circuit is broken, as will be described, and effectively stops operation of the driven mechanism during the coasting of the motor before the latter comes to a complete stop.

A manual drive for the different mechanisms is provided by a hand crank 387 (Fig. 1) connected to shaft 389 on which a gear 390 (Fig. 3) is fixed. Gear 390 is in a train of gearing leading to shaft 380 of driven pulley 379. Thus, operation of crank 387 actuates shaft 380 to manually drive the various mechanisms of the machine.

The electrical part of the machine will now be explained, with reference particularly to the circuit diagram, Fig. 25. A three-phase alternating current supply is provided through lines L1, L2, and L3. By depressing start key ST, start key contacts ST' are closed to form the following circuit:

*Start circuit.*—From line L3, through contacts ST', stop key contacts SP' (opened by depressing stop key SP at will), previously mentioned contacts 34, safety contacts 391a, controlled by a coil 391, through a coil 392 and through safety contacts 393a controlled by a coil 393, to line L1.

This circuit energizes coil 392 to move switch rod 394 to the left (Fig. 25) against resistance of a spring 395, causing points 394a to connect line L3 to a line 396, shunting start key contacts ST' out of the start circuit.

At the same time, points 394b connect line L3 to the motor M through coil 391, points 394c connect line L2 to the motor, while points 394d connect line L1 to the motor through coil 393.

In the event of an overload of current, coils 391 and 393 will be energized to such an extent as to respectively open contacts 391a and 393a, thereby opening the circuit of coil 392 to cause the switch rod 394 to return to open position.

Contacts 34, when opened, also break the circuit of coil 392 to cause switch rod 394 to move to open position. As previously explained, contacts 34 are automatically opened when the supply roll 10 of card material is exhausted and when roll sensing arm 341 is latched on pin 347 in upper position. Also, contacts 34 are opened under control of the thickness detector 27—28 when the thickness of the web exceeds the maximum permissible thickness, as explained before. Still further, contacts 34 are opened under control of a stack of cards on stacker table 230 when such stack engages arm 328 in the event the operator has neglected to remove the stack. Under all of these conditions, contacts 34 are opened to break the circuit of coil 392, causing switch rod 394 to move to open position for breaking the motor circuits.

Contacts 34 are further controlled by a solenoid 397 (see Fig. 3), which is under control of the jam detector comprising plates 87 (Figs. 7 and 21) and rod 89 carrying the plates. As described hereinbefore, if the web of material C above the printing rolls 74 and 75 is kinked or jams, then member 89 rocks to tilt a spring rod 92 to engage contact disk 95 with a contact sleeve 94. When this happens, a circuit is formed, as follows:

*Jam detector circuit.*—From line L1, through points 394d, through line 398, solenoid coil 397, contact block 93, contact disk 95, contact sleeve 94, line 399, points 394b, and to line L3.

Energization of solenoid 397 results, causing its plunger 400 to rock bell crank lever 402 clockwise (Fig. 3) against resistance of a spring 403. The lower end of lever 402 has a pin 404 passing through an elongated slot 405 in rod 32. Normally, the pin 404 is at the left hand end of slot 405. Movement of rod 32 by arm 31 to open contacts 34 brings the slot to a mid-position with respect to pin 404. Thus, movement of rod 32 due to operation of arm 31 for opening contacts 34 moves rod 32 to the left without affecting lever 402. However, when solenoid 397 operates lever 402, pin 404 engages the left end of slot 405 to shift rod 32 to the left, causing block 32' to open contacts 34. The motor operating circuit is thereby opened.

The clockwise rocking of lever 402 also causes the material below the feed rolls 73 to be cut off by blade 72, thereby preventing further feeding and jamming of the material. For this purpose, lever 402 is connected by a link 407 (Fig. 3) to an arm 408 on a shaft 409 which carries knife blade 72 (see Fig. 1). Thus, clockwise rocking of lever 402 causes shaft 409 to rock counterclockwise, thereby moving blade 72 against the web of material C to sever it below feed rollers 73. By so doing, the web is prevented from continuing to feed and jam through the feed rolls 73 and printing couple 74—75 when a kink in the web is detected by the jam detector plates 87 above the printing couple. At the same time, switch 34 is opened to break the motor circuit. When switch 34 is opened for any other reason except a jam detected by plates 87, lever 402 is not operated and blade 72 does not act to cut the material.

When opening the motor circuits to stop operation of motor M, driving belt 378 is also loosened by releasing latch arm 386 from arm 383a of lever 383. Latch 386 is controlled by a solenoid 410 (see Fig. 3). As shown in the circuit diagram, Fig. 25, solenoid 410 is directly across opposite lines 398 and 399, and, therefore, remains energized while switch bar 394 is in closed position and motor M is running. When contacts 34 are opened due to any of the aforementioned causes or when the safety contacts 391a and 393a open, then magnet 392 is deenergized, switch bar 394 moves to open position, and the current is taken off lines 398 and 399. As a result, solenoid 410 is deenergized, permitting spring 411 to rock latch 386 clockwise (Fig. 3), thereby withdrawing its support from arm 383a of lever 383. Consequently, the motor M and its base plate 375 drop, causing driving belt 378 to loosen. The driving connection of motor M to the gearing of the machine is thereby released while at the same time the motor, its circuit having been broken coasts to a stop.

To resume machine operations, the start key ST is again depressed to close contacts ST' for establishing the start circuit. The motor will thereby be set running, and at the same time solenoid 410 will be energized, but latch 386 cannot move to latching position because the front of arm 383a is in the way. Belt 378, therefore, is still loose so that the motor at the start is not operating the various gear trains of the machine. To tighten belt 378, the operator manually actuates handle 385 fixed to shaft 384 of lever 383 to rock the lever counterclockwise (Fig. 3), thereby gradually tightening the belt to effect a gradual acceleration of the operation of the machine to its full speed. This permits latch 386 to move beneath arm 383a to retain the lever 383 in counterclockwise position, in which belt 378 is tightened to communicate operation of motor M to the driven gearing.

*Summary*

Referring to Figs. 1 and 25, to start operations, the operator presses start key ST. The starting circuit is thereby formed, followed by the shunting out of the start contacts ST', as explained above. Motor M is now running. The operator then actuates handle 385 to rock lever 383 for raising the motor to tighten the driving belt 378 on pulleys 377 and 379 (see Fig. 3). Lever 383 is latched in position by latch 386. The motor is now driving the various mechanisms of the machine. The web of material C now feeds off the supply roll 10, around a swivel-supported guide roll 24, through the slot of thickness-detecting element 27 over guide roll 37, around tension-reacting roller 22, and over guide roller 37a. The web then passes around roller 37b, then between roller 38 and plate 39, along guide plate 46, past emergency cutter 72, and into the grip of feed rollers 73. The latter feed the web through the printing couple 74—75 which prints successive card forms on a face of the web. The web then proceeds through plates 87 of the jam detecting device, then between rotary shear devices including blades 102 and 106 (Fig. 6), and into a pair of vertical guide flutes 110c of spaced, fluted, rollers 110a—110b. As the web is moving upwardly, blades 102 and 106 coact with a scissors action to shear the web and form a separate tabulating card T, now above the cutting blades. Due to the momentum of the card and to the engagement of the top of blade 102 with the bottom of the card, the card continues its upward feed and the card, as its cut is completed, enters at its upper end between the now open jaws of delivery grippers 123—125. The latter are then in their lower position and now start their rising stroke. As the grippers rise, the card due to its velocity and to feeding action of blade 102 follows and remains in position between the jaws of the grippers. Before the latter reach the mid-position of their rising stroke, their jaws close and grip the card to continue upward feed of the card. The upper end of the card is then gripped at opposite sides by the pair of delivery grippers 123—125. While this is happening the flutes 110c guiding the web above the cutters are moving the web forwardly and out of the plane of the web below the cutters. Delivery grippers 123—125 deliver the card to a clip 144 on a conveyor drum 140 which continuously rotates counterclockwise (Fig. 1).

After passing the corner clipper, the card meets a paddle 192 to rotate a paddle wheel 193 one tenth of a revolution. Each revolution of the wheel 193 causes closing of contacts 203 to energize magnet 205 of a Veeder counter 206.

After passing the counter-controlling wheel 193, the card is guided between side plates 190 and 212 and along the front of guide bars 209 and 214. A cam block 210 then acts on extension 149 of the carrying clip 144 to release the clip from the card. The clip continues moving to the right, while the card remains behind and drops down into a pocket of stacker table 230 and onto platform plates 242 and 243 carried by a vertically slidable carriage 246. Throughout the conveying of the cards, from the time they are delivered to drum 140 to the time the drum releases the cards to the stacker pocket, the cards are held apart from and out of contact with each other, as may be understood from Figs. 1, 18 and 20. Accordingly, the ink on the cards is permitted to dry while the cards are being carried on the drum 140. When the stacker pocket is filled, the weight of cards on platform 242—243 has depressed carriage 246 against resistance of spring 248 to an extent sufficient to cause a roller 253 supported by arm 254 (Fig. 22) to move above the top of the carriage. Thereupon, a spring 256 rocks arm 254 carrying the roller counterclockwise, thereby rocking shaft 255 of arm 254. The rocking of shaft 255 releases a latch 260 from a clutch pawl 261 which thereupon couples a driven shaft 266 to a driving worm gear 268. Shaft 266 makes a single revolution, during which a cam 275 thereon acts on arm 276 (Fig. 14), a link 282, and a plate 283 to cause a pawl 287 on the plate to actuate a ratchet ring 286 for one step. Ratchet ring 286 is fixed to stacker table 230 and, thereby, actuation of the ratchet member moves the table one step, during which the filled pocket is moved out of the card receiving station and the following, empty, pocket brought to the card receiving station.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination; a conveyor and a plurality of spaced clamps mounted thereon, each having a gripping face to clamp one edge of an article, such as a card or the like, against a surface of the conveyor, with the remainder of the article extending free of the conveyor, and means for maintaining said articles out of contact with each other during the travel of the conveyor.

2. In combination, a rotary drum conveyor, a plurality of circumferentially disposed clamps mounted on the conveyor, each clamp having a gripping face to clamp one end of an article, such as a card or the like, against the circular periphery of the conveyor while the remainder of the article extends outwardly from and substantially tangentially to the periphery, whereby the articles are carried in substantially fan-wise, tangential relation by the conveyor, and means for maintaining said articles out of contact with one another during a portion of the travel of the conveyor comprising outwardly turned ends on the clips, each for abutting the article gripped by the preceding clip on the conveyor so as to space the surface of latter article apart from the surface of the following article.

3. In combination, a rotary drum conveyor, a plurality of circumferentially disposed clamps mounted on the conveyor, each having a gripping face to clamp one end of an article, such as a card or the like, against the periphery of the drum conveyor while the remainder of the article extends outwardly from the conveyor substantially at a tangent thereto, whereby the articles are carried in substantially fan-wise disposition by the conveyor, and means for maintaining the articles out of contact with one another and in substantially the same fan-wise disposition during a certain portion of their travel with the conveyor, comprising a stationary abutting surface external to the conveyor for abutting the free ends of the articles, while the latter are extending substantially vertically upward from their clamp ends, to prevent the articles from bending downwardly about their clamped ends.

4. In a machine having mechanism to advance material in a certain direction, the combination of reciprocating gripping means having a return stroke toward the said mechanism and an opposite, delivery stroke in said direction toward a location remote from the said mechanism, means for mounting the gripping means for such reciprocation, means for effecting said reciprocation, and means for opening the gripping means during its delivery stroke to enable the material while being advanced by said mechanism to enter freely and remain in position to be gripped by the gripping means, the gripping means closing after the material enters therein to grip the material and during the continuation of the delivery stroke uninterruptedly to continue the advance of the material in said given direction for delivering the material to the remote location.

5. In a machine having means by which sheet material is advanced to a transfer station to be transferred to a remote location; gripping means for the material, means for mounting the gripping means for oscillation between the transfer station and the remote location within a curved path along the plane of the sheet material to seize the material and during one stroke of the oscillation transfer the material from the transfer station to the remote location and during the other stroke of the oscillation to return towards the first-named means, and automatic, power-actuated means for effecting the oscillation of the gripping means.

6. In a machine in which articles such as cards or the like are successively brought to a transfer station to be transferred by movement in a certain direction to a location remote from said station, transfer means comprising a gripper, a pivot for the gripper disposed transversely to the plane of the article, means for oscillating the gripper on said pivot and along substantially the plane of the article in a curved path overlapping the side of the article for seizing the side of the article behind the end leading in said direction at the transfer station and during one stroke of its oscillation moving the article in said direction to the remote location, and means for automatically effecting one such oscillation of the gripper for each article brought to the transfer station.

7. In a machine having means from which articles, such as cards or the like issue, the combination of receiving means to receive each article subsequent to its issue, a gripper movable between the first-named means and the receiving means in a curved path along the plane of the issuing article to receive the article and deliver it to the receiving means, and guiding means for restricting the article while being moved by the gripper to a line of movement diverging from the final portion of the curved path of the gripper whereby the gripper slips off the article after the latter has been delivered to the receiving means.

8. In a machine having means from which cards or the like issue; the combination of card-receiving means to receive the cards subsequent to their issue, a pair of grippers movable in opposite curved paths between the first-mentioned means and the receiving means and along the plane of the issuing card to grip the opposite sides of the card and deliver the latter to the card-receiving means, and means for guiding the card, while being delivered, in a path intermediate and divergent from the curved paths of the grippers whereby the grippers after delivering the card to the receiving means slip off the sides of the card to leave the latter solely in the possession of the receiving means.

9. In a machine having operating means to operate on cards, card-receiving means, a pair of grippers movable from the operating means to the receiving means to deliver a card from the operating means to the receiving means and during the first portion of their movement gripping the opposite sides of the card and moving it towards the receiving means and having the final portion of their movement diverging from the sides of the card to slip off the latter after delivery to the card-receiving means, and means for restraining the card from following the grippers during the aforesaid final portion of their movement.

10. In a machine having means from which cards or the like issue in succession; the combination of a card clamp movable past a card-receiving position, means for opening the clamp as it passes the card-receiving position, grippers for gripping the sides of the issuing card and delivering it to the opened clamp at the receiving position, the clamp closing, after receiving the card, as it continues its movement beyond the card-receiving position while the grippers slip off the sides of the card to free the latter.

11. In combination; an article receiver movable past a receiving position, a reciprocating gripper for gripping an article and during one stroke delivering it to the receiver, and means for moving the gripper after delivering the article, in a path removed from the path of the article to enable the gripper to move through its return stroke unimpeded by the delivered article.

12. In combination; means for receiving a flat article, such as a card or the like, a gripper reciprocating substantially in the plane of the article for gripping the article during one stroke to deliver it to the receiving means, and means for moving the gripper, after delivery of the article, to a plane remote from the plane of the article.

13. In combination; means in a receiving plane for receiving the leading edge of a flat article, such as a card or the like, reciprocating gripping means, movable in a path inclined to said receiving plane, for gripping the sides of the article and intermediate one stroke, delivering its leading edge to said receiving means and after delivery thereof continuing its latter stroke to a plane behind the receiving plane.

14. In combination; means to act on cards in succession, a card clamp to receive the card subsequent to its being acted on, and transfer means between the first-named means and the card clamp to transfer a card from the former to the latter, the transfer means including an oscillating gripper swinging during one stroke from the first-named means to the clamp to grip a side of the card during a portion of the stroke and move the card to the clamp, the gripper after delivering the card swinging, through the final portion of its aforesaid stroke, away from the side of the card gripped thereby to thereby slip off the side of the card.

15. The machine as defined in claim 14, in which the gripper is mounted to swing in a plane inclining away from the card plane as the latter is received by the clamp, whereby the side portion of the card in the grip of the grippers is flexed to the rear of the plane of the portion of the card in the grip of the clamp and whereby after the gripper slips off the side of card, the rearwardly flexed portion snaps back to its normal plane out of the path of return movement of the gripper.

16. In a machine having means from which substantially vertically disposed articles, such as cards or the like successively issue in one direction; substantially vertically disposed guide means for receiving and guiding the successively issuing articles, means for moving said guide means transversely to said direction to remove the articles received and guided by the guide means from the path of the following issuing articles, and means for engaging an article while coacting with the guide means to control vertical movement of the article with respect to the guide means.

17. In a machine having operating means to operate on successive cards or the like, means to continuously move the cards or the like through the operating means to be operated on, continuously movable guide means for shifting each card or the like, after being operated on, transversely of its plane to remove the lagging edge of the card or the like just operated on from the path of the leading edge of the continuously moving following card or the like, and means for removing the card or the like from the guide means.

18. In a machine having means to operate on successive flexible strips, means for continuously feeding the strips through and past the operating means, and means for flexing the portion of the strip past and unrestrained by the operating means transversely of the portion of the strip being operated on while the latter strip continues to feed whereby when the lagging edge of the latter strip passes the operating means it immediately snaps out of the way of the leading edge of the following strip.

19. In a machine having means from which articles, such as cards or the like, issue successively in one direction; the combination of means to shift each successively issuing article transversely of the issuing direction to remove it from the path of the next issuing article, and means for continuing to move the article, while being shifted transversely, in the same general direction as the issuing direction.

20. In a machine having means from which articles, such as cards or the like issue successively in one direction; the combination of guide means for receiving successively issuing articles, means for moving the guide means transversely of said issuing direction to shift each article guided thereby out of the path of the following issuing article, and means to feed the articles, while being shifted transversely, along the guide means in the same general direction as the issuing direction.

21. In a machine having operating means to operate on successive articles such as cards or the like, means for moving the articles in a certain direction, through the operating means, means for removing the article after being operated on, in the same general direction as the aforementioned direction, and means to shift the article, while being removed, transversely of the following article, to thereby enable the latter to move faster than the article being removed.

22. In a machine having operating means to operate on successive cards or the like, means to move the cards in a certain direction through the operating means, means for removing the card, just operated on, in the same general direction as the aforesaid direction, and guiding means to engage and guide the latter card, while being removed, transversely of the following card to enable the latter card to move faster than and to overlap the card being removed.

23. In a machine having means to operate on successive cards or the like, means to move the card in succession through the operating means, means for removing the card just operated on in the general direction of the plane of the card, means for shifting the card, while being removed, transversely of its plane to displace the latter card from the path of movement of the following card, and a card conveyor to which the transversely shifted card is removed.

24. In combination; means for continuously feeding successive cards or the like in one direction, guide means continuously movable about an axis generally parallel to the aforementioned direction for engaging the successively leading cards and shifting them transversely to said direction and means for removing the cards or the like from the guide means.

25. In a machine in which substantially flat articles, such as cards or the like, are successively brought to a certain position; the combination of a plurality of pairs of companion guides, each pair for receiving and guiding the opposite side edges of an article, means for moving the guide pairs, one after another, transversely across said position, each pair to receive an article at said position and shift it transversely out of said position, and means for advancing the article along the guide pair while being shifted transversely thereby.

26. In a machine having means from which generally flat articles, such as cards or the like, issue in succession along an issue plane; the combination of a fluted device with a plurality of flutes, each to receive and guide the edge of one article, means to move the device so as to traverse the flutes thereof successively and transversely past the issue plane, as each successive article issues to thereby cause each flute to receive one issuing article and shift it transversely out of said plane, and means to remove the article from the fluted device.

27. In a machine having means from which generally flat articles, such as cards or the like, issue successively along an issue plane; the combination of spaced fluted rollers having their flutes extending generally parallel to the issue plane, and means for continuously rotating the rollers in opposite directions to cause companion pairs of flutes, one of each roller, to traverse the issue plane in succession for receiving the successive articles and shifting them transversely of the said plane, there being a plurality of flutes in each quadrant of each roller to enable a plurality of the articles to be simultaneously engaged and shifted one behind another by a plurality of the companion pairs of flutes while the rollers are continuously rotating.

28. In combination; means to feed card forms in succession, a pair of transversely spaced fluted rollers having their flutes extending generally parallel to the plane of the card forms being fed, and means to effect opposite rotations of said rollers to successively and transversely move paired flutes, one of one roller and a companion one of the other roller, across said card plane, each pair in succession receiving the leading card form to shift it, as the rollers rotate, transversely of said plane while the feed of the latter card form by the first-named means continues.

29. In combination; means to feed card forms in succession, a pair of transversely spaced rotatably mounted fluted members having companion flutes provided with entrance ends to receive and guide the opposite side edges of the leading card form, means to effect opposite rotational movements of the fluted rollers to successively move companion flutes across the plane of the leading card form to receive the side edges thereof and to transversely shift it out of the path of the following card form, and means to remove the card form from the companion flutes.

30. In combination; means to feed card forms in succession, a pair of transversely spaced fluted rollers having their flutes extending generally parallel to the plane of the leading card form, means for effecting opposite rotations of the rollers to successively traverse a pair of companion flutes, one from each roller, across said plane, to receive, guide, and move the successive leading card forms, the card forms in successive pairs of companion flutes being held thereby during rotation of the rollers one behind another, and means to successively remove the card forms from the fluted rollers.

31. In combination, a pair of parallel, spaced rollers, each having a surface generally parallel to the axis of the roller, said surfaces of the rollers being adapted to engage the opposite side edges of a card or the like to shift it transversely during rotation of the rollers in opposite directions, means to rotate the rollers in opposite directions to cause the companion surfaces to shift a card transversely to a delivery plane, a clamp to hold one card or the like, and actuating means for moving the clamp across the delivery plane to receive the card or the like on the companion surfaces and to remove the latter card or the like from the delivery plane.

32. The combination as defined in claim 31, each of said rollers having a plurality of circumferentially spaced surfaces whereby successive companion pairs of said surfaces engage and shift a plurality of cards or the like in succession to the delivery plane, there being also a plurality of successive ones of said clamps and a common carrier therefor moved by the actuating means so as to traverse the clamps successively past the delivery plane to receive the cards in succession from the rollers and remove them successively from the delivery plane.

33. In a machine having operating means from which articles such as cards or the like issue in succession, the combination of gripping means including a pair of friction-gripping jaws adapted to move in unison along substantially the plane of one side of an article issuing from the operating means, automatic means for effecting one reciprocation of the gripping means for each article successively issuing from the operating means, means to cause successive opening and closing of the jaws during each reciprocation, with the jaws when open enabling said side of the issuing article to enter freely until the jaws overlap the opposite surfaces of the article extending from said side and whereby, upon subsequent closure of the jaws, the jaws frictionally grip said opposite surfaces and carry the article bodily, during one stroke of a reciprocation, towards a receiving station, and a conveyor with successive friction-gripping elements successively traversing the receiving station in synchronism with the delivery by said gripping means of the successively issued articles, with each said element seizing the leading end of the article being carried by the jaws to the receiving station and removing the article from the receiving station.

34. In a machine having means from which articles such as cards or the like issue in a suitable direction, the combination of reciprocating means to engage the side of an issuing article and advance the article bodily substantially in said direction during one stroke of the reciprocation, means for effecting one reciprocation of the reciprocating means for each successively issuing article, transversely movable means for engaging the article while being advanced by the reciprocating means and shifting the article substantially parallel to itself while being advanced, movable gripping means for seizing the leading end of the advanced and laterally shifted article, and means for moving the gripping means to displace the article to a location remote from the reciprocating means and the transversely movable means.

FRED M. CARROLL.